United States Patent
Shimizu

(10) Patent No.: US 6,515,801 B1
(45) Date of Patent: Feb. 4, 2003

(54) LATERAL COLOR COMPENSATION FOR PROJECTION DISPLAYS

(75) Inventor: Jeffrey A. Shimizu, Cortlandt Manor, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/028,053

(22) Filed: Dec. 21, 2001

(51) Int. Cl.$^7$ ............................................... G02B 27/14
(52) U.S. Cl. ...................................... 359/634; 359/639
(58) Field of Search ................................ 359/618, 619, 359/622, 624, 629, 637, 638, 639, 640, 634; 353/33, 34, 37; 348/335, 336, 337, 338, 339

(56) References Cited

U.S. PATENT DOCUMENTS

| | | | |
|---|---|---|---|
| 2,403,731 A | 7/1946 | Macneille | 88/65 |
| 5,148,314 A | 9/1992 | Chen | 359/642 |
| 5,453,859 A | 9/1995 | Sannohe et al. | 359/63 |
| 5,526,185 A | 6/1996 | Herloski | 359/642 |
| 5,625,495 A | 4/1997 | Moskovich | 359/663 |
| 5,777,789 A | 7/1998 | Chiu et al. | 359/494 |
| 5,870,228 A | 2/1999 | Kreitzer et al. | 359/649 |
| 5,905,596 A | 5/1999 | Watanabe | 359/663 |
| 5,986,809 A | 11/1999 | Itoh et al. | 359/618 |
| 6,094,311 A | 7/2000 | Moskovich | 359/651 |
| 6,113,239 A | 9/2000 | Sampsell et al. | 353/31 |
| 6,118,588 A * | 9/2000 | Yamamoto | 359/618 |
| 6,144,497 A * | 11/2000 | Hayashi et al. | 359/634 |
| 6,183,091 B1 | 2/2001 | Johnson et al. | 353/201 |
| 6,307,607 B1 * | 10/2001 | Jepsen et al. | 349/117 |
| 6,382,799 B1 * | 5/2002 | Nishikawa et al. | 353/122 |
| 6,404,552 B1 * | 6/2002 | Manabe | 359/487 |
| 6,404,558 B1 * | 6/2002 | Chuang et al. | 359/634 |

FOREIGN PATENT DOCUMENTS

| | | | |
|---|---|---|---|
| WO | WO0070386 | 11/2000 | G02B/27/28 |
| WO | WO0109677 | 2/2001 | G03B/21/14 |

OTHER PUBLICATIONS

"Optics" Third Edition, Eugene Hecht, Adelphi University, 1998, pp. 173–177, 271–272.
"Modern Optical Engineering", Third Edition, Warren J. Smith, 2000, pp. 141–143, 150–151.

* cited by examiner

Primary Examiner—Georgia Epps
Assistant Examiner—Saeed Seyrafi

(57) ABSTRACT

Compensation of lateral-color chromatic-aberration effects in a digital color-graphics projection display is achieved by providing projection optics for the projection display which is nontelecentric to a certain degree to establish an angled geometry for gathering light off axis for projection by the projection optics and by providing a plurality of component-primary-color object planes for object digital graphics of different primary colors to be projectively displayed through the projection optics. At least two of the component-primary-color object planes are located at different effective axial distances from the projection optics. The effective axial distances of the object planes from the projection optics are respectively keyed to the angled nature of the off-axis light gathering of the projection optics and to the lateral-color chromatic-aberration differences in lateral magnification by the projection optics at different primary colors so that such color-dependent differences in lateral magnification tend to be compensated.

18 Claims, 4 Drawing Sheets

LATERAL COLOR COMPENSATION FOR PROJECTION DISPLAYS

FIELD OF THE INVENTION

The invention relates broadly to color digital-graphics projection displays based on primary color digital-graphic-encoding beam modulator panels and projection optics for such projection displays. More particularly, the invention relates to such color digital graphics projection displays and projection optics providing compensation for a lateral color chromatic aberration.

BACKGROUND ART AND SUMMARY OF THE INVENTION

A typical color digital-graphics projection display arrangement uses three digital-graphic-encoding beam modulator panels, one for each of a red, a green, and a blue component of a color graphic. Examples of beam modulator panels include transmissive polysilicon liquid crystal displays (LCDs), reflective digital micromirror devices (DMDs), and reflective liquid crystal displays (RLCDs)—also known as reflective liquid crystal on silicon displays (LCoS). Often graphic-encoded beams from the three panels are combined optically with component-color beam recombination optics and projected through a single projection lens.

With increasing demands for higher resolution, higher pixel count, and smaller devices, the difficulty of designing projection lenses for color digital-graphic projection displays has increased. One characteristic of a projection lens that becomes emphasized is a characteristic referred to as "lateral color." Lateral color refers to a chromatic aberration involving a dependence in lateral magnification of a graphic on the wavelength or color or color of the graphic. Such a change in lateral magnification with color typically results in a change in the convergence of the superimposed component-color imaged graphics from red, green, and blue digital-graphic encoding beam-modulator panels from the center of a projected graphic display outwards. So, if digital-graphic-encoding panels are positioned so that there is perfect convergence of the component color pixels of a graphic in the center of the display, the color convergence can be off by a pixel or more at the edge of the display. Such variation in color convergence degrades graphic quality, particularly for projection of computer graphics displays.

Limiting lateral-color misconvergence is a significant issue in the development of three-panel projection monitors. For example, a projection monitor employing panel arrays having 1200×1600 pixels, with each pixel being about 10 microns square, and subject to a design objective of a half pixel or less of lateral-color misconvergence presents a difficult objective for a projection lens maker to achieve. A conventional projection monitor with such panel arrays might have a lateral-color misconvergence at the corners of the graphic of about 12 microns measured at the panel arrays, which is greater than a pixel. Lateral-color misconvergence of such magnitude is a significant problem in computer display monitor applications, where icons and menus are typically placed at the edges of the graphic display. In general, to compensate for lateral color effects, a projection lens would have to increase in size and contain additional elements, which results in an increase in design complexity and cost. As a practical matter, lens design alone is not enough to meet the demands of increased display resolution.

An emerging direction in electronic projection displays is reflective-polarization-modulator based systems employing reflective liquid-crystal polarization modulators. Many of the architectures based on reflective polarization modulators employ arrangements where the distance from the polarization-modulator panel to the projection lens is large compared to the focal length of the projection lens. This is especially true for rear projection displays, such as projection monitors and projection television. In general, the greater the back-focal distance, the more difficult it is to produce a projection lens. Another optical design constraint that makes a projection lens a challenge to produce for such systems is a requirement for "telecentricity." A telecentric lens system has an entrance pupil at infinity. In terms of chief rays—also termed "principal rays"—having an entrance pupil at infinity means that the chief rays are parallel to the optical axis, thus resulting in every point on an image possessing the same set of angles or pupil properties.

A conventional digital-graphic projector employing reflective liquid-crystal polarization modulators and a telecentric projection lens is disclosed in U.S. Pat. No. 5,777,789 to Chiu et al. The projector of the '789 patent has a metal-halide arc lamp as a source of unpolarized "white" light for the projector. Light from the arc lamp passes through illumination optics which function to form a generally parallel, visible white-light illumination beam of generally uniform intensity spatially with respect to polarization-modulator faces of the liquid-crystal polarization modulators employed in the projector. The unpolarized illumination beam is directed into a polarizing beamsplitter cube, which splits the unpolarized beam into two beams of substantially—but, conventionally, not perfectly—polarized light, with the respective polarizations of the two beams being substantially orthogonal. One of the two light beams so produced in the polarizing beamsplitter cube of the digital-image projector of the '789 patent serves as a substantially polarized source beam and is directed from the splitting/combining prism assembly is comprised of three prisms with certain of the faces of the prisms bearing dichroic coatings for sequentially separating red, blue, and green light components from the visible white light of the substantially polarized source beam and directing each substantially polarized component-color light beam onto a corresponding reflective liquid-crystal polarization modulator—referred to as a "light valve" in the '789 patent.

Each of the three polarization modulators of the digital-image projector of the '789 patent is positioned with a reflective polarization-modulator face perpendicular to a component-beam optical path defined with respect to the corresponding substantially polarized color-component light beam exiting a color-component output face of the color splitting/combining prism assembly. According to the '789 patent, the images of the reflective liquid-crystal polarization modulators are brought into coincidence upon the projection screen by mechanical adjustment of the polarization modulators relative to the color-component output faces of the prism assembly. In general, a reflective polarization modulator serves to modulate the polarization of the corresponding color-component light beam spatially by means of selective rotation of the polarization of the light of the beam on a pixel-by-pixel basis over the polarization-modulator face in accordance with a signal applied to the polarization modulator which encodes a component color image of a desired composite color graphic. In particular, for each pixel of the final imaged graphic which is to be illuminated in a given color, the polarization of the substantially polarized color-component light beam of that color is rotated by the reflective liquid-crystal polarization modulator at a location on the polarization-modulator face corresponding to the location of the pixel in the final imaged graphic. Such illuminated pixels are referred to as "light" pixels. Conversely, for each pixel of the final imaged graphic which is not to be illuminated in a given color, the substantially polarized color-component light beam of that color is reflected with the polarization of the beam unchanged by the reflective liquid-crystal polarization modulator at the location on the polarization-modulator face corresponding to the location of the pixel in the final image graphic. Such non-illuminated pixels are referred to as "dark" pixels.

The color-component light beam thus spatially selectively polarization modulated by a liquid-crystal polarization modulator of the digital-graphics projector of the '789 patent is reflected from the reflective polarization-modulator face of the polarization modulator substantially back along the corresponding component-beam optical path through the color splitting/combining prism assembly. Each of the three reflected color component light beams substantially retraces its original path through the prism assembly and recombines with the other two color component light beams to form one composite spatially selectively polarization-modulated light beam. The composite light beam emerges from the color splitting/combining prism assembly and passes into the polarizing beamsplitter cube. The polarizing beamsplitter cube splits the composite light beam into a polarization-modulated light-pixel component beam which carries the composite color graphic made up of light pixels and a non-polarization-modulated dark-pixel component beam which carries a color-negative graphic made up of dark pixels. Since the polarization of the dark-pixel component beam was unchanged by the reflective liquid-crystal modulators, the dark-pixel component beam retraces an optical path through the projector back towards the arc lamp which was the source of illumination. The polarization-modulated light-pixel component beam is directed from the polarizing beam splitter into a projection lens of the digital-graphics projector of the '789 patent. According to the '789 patent, the projection lens is a retrofocus telecentric lens designed to accommodate a large glass working distance and telecentric illumination. The projection lens serves to project the desired composite color graphic onto a projection screen.

In general, designers of projection displays strive to achieve a "perfect" projected graphic. However, projection-display designers are faced with difficulties such as maintaining proper image height in the projected graphic and lateral color effects, to name a few. With either a single digital-graphic-encoding beam modulator panel or multiple beam modulator panels and a telecentric system, a designer must achieve such a "perfect imaged graphics" through lenses. However, to achieve a "perfect" imaged graphic through lens systems alone is problematic and frequently so costly as to be beyond economic feasibility. Whether such lens systems are situated in front of or behind a beam modulator panel, there are often problems with lateral color, even with the best lens systems currently available. A projection-display designer who is trying to achieve a "perfect" imaged graphic is constrained as a practical matter by lens systems.

What is needed is a projection display system that provides compensation for lateral color effects, and which simplifies lens design so that satisfactory color convergence can be achieved over an entire projected graphic. An advance in the art is achieved with a projection-optics lens assembly and digital graphics projection display of the invention providing excellent compensation for lateral color effects for digital color-graphics projection.

Broadly, compensation of lateral-color chromatic-aberration effects in a digital color-graphics projection display is achieved in the invention by providing projection optics for the projection display which is nontelecentric to a certain degree to establish an angled geometry for gathering light off axis for projection by the projection optics and by providing object planes for object digital graphics of different primary colors to be projectively displayed through the projection optics which are located at different effective axial distances from the projection optics, which axial distances are respectively keyed to the angled geometry of the off-axis light gathering of the projection optics and to lateral-color chromatic-aberration differences in lateral magnification by the projection optics at different primary colors so that such color-dependent differences in lateral magnification tend to be compensated.

Preferably, the projection optics of a digital color-graphics projection display of the invention provide three component-primary-color object planes respectively for object graphics of red, green, and blue. The effective axial distances of the three component-primary-color object planes from the projection optics preferably differ from one another.

The projection display of the invention preferably includes three component-primary-color digital-graphic-encoding beam-modulator panels corresponding respectively to one of the component primary colors of red, green, and blue. Each beam-modulator panel preferably comprises a plurality of optical-modulator pixel elements arranged in a planar array. Each of the component-primary-color digital-graphic-encoding beam-modulator panels is preferably positioned with the planar array of optical-modulator pixel elements of the beam-modulator panel located proximate to the corresponding component-primary-color object plane of the projection display. Each optical-modulator pixel element of a component-primary-color beam-modulator panel is adapted to controllably modulate optically light illuminating the pixel element in accordance with graphics-encoding control signals applied to the beam-modulator panel. The optical-modulator pixel elements of a component-primary-color beam-modulator panel are preferably adapted collectively to spatially optically modulate on a pixel array basis a component-primary-color light beam illuminating the beam-modulator panel in accordance with a corresponding primary-color graphic component of the desired composite-color digital graphic to form a graphics-encoded component-primary-color beam. A component-primary-color encoded-beam central axis may be defined respectively for each graphics-encoded component-primary-color beam with each component-primary-color encoded-beam central axis intersecting the corresponding component-primary-color beam-modulator panel at essentially normal incidence at a component-primary-color modulator-panel central-axis intersection point. Respective planar arrays locating the positions of optical-modulator pixel elements on the three component-primary-color beam-modulator panels together with the respective component-primary-color modulator-panel central-axis intersection points are preferably essentially geometrically congruent with one another. An object pixel-spacing distance may be defined as an average center-to-center distance between adjacent pixel elements in the beam-modulator panels.

The composite-color image plane of the projection display of the invention preferably has an array of composite-color pixel locations defined with respect thereto. Each composite-color pixel location in the composite-color image plane preferably corresponds to three optical-modulator pixel elements located respectively at essentially congruent positions on the beam-modulator panels. A projection-optics central axis may be defined with respect to the projection optics passing centrally through the projection optics. The projection optics of the projection display of the invention has a projection optics aperture stop located at a projection-optics aperture stop location along the projection-optics central axis. A composite-color image-plane central-axis intersection point may be defined by an intersection of the projection-optics central axis with the composite-color image plane corresponding to the three component-primary-color modulator-panel central-axis intersection points.

A composite-color image test-point location is preferably defined in the composite-color image plane of the projection display of the invention laterally displaced from the composite-color image-plane central-axis intersection point and corresponding to a location of a single composite-color pixel in the composite-color image plane. The composite-color image test-point location in the composite-color image plane preferably corresponds to three optical-modulator object test-point pixel elements located respectively at essentially congruent positions on the three component-primary-color beam-modulator panels. For each component primary color, a component-primary-color test-point chief ray trace may be defined, tracing as a ray of light of the component primary color, from the composite-color image test-point location in the composite-color image plane through the projection optics, passing through a center point of the projection-optics aperture stop, and through any intervening optics of the projection display to intersect the corresponding component-primary-color beam-modulator panel at a point laterally displaced from the central-axis intersection point of the beam-modulator panel. Each of the three component-primary-color test-point chief ray traces optically traces a component-primary-color-dependent path manifesting chromatic aberrations of the optics through which the chief ray trace passes including the lateral-color chromatic-aberration differences in lateral magnification. The projection-optics aperture-stop location of the projection-optics aperture stop of the projection optics of the projection display of the invention is a nontelecentric aperture-stop location such that each component-primary-color test-point chief ray trace intersects the corresponding component-primary-color beam-modulator panel at a nontelecentric angle of intersection inclined with respect to a normal to the beam-modulator panel at the point of intersection in accordance with the angled geometry for gathering light off axis for projection by the nontelecentric projection optics. Each of the three component-primary-color beam-modulator is preferably individually positioned axially with effective axial distances from the projection optics so that, taking into account the nontelecentric angle of intersection of the component-primary-color test-point chief ray trace with the corresponding component-primary-colors beam-modulator panel and chromatic aberrations including the lateral-color chromatic-aberration differences in lateral magnification at the respective component primary colors, the corresponding component-primary-color test-point chief ray trace intersects the beam-modulator panel within about one half of the pixel-spacing distance of a center of the corresponding object test-point pixel element, so that differences in the lateral magnification of light rays of different component primary colors of the projection optics tend to be compensated for over the composite-color graphics imaged by the projection optics in the composite-color image plane.

The digital-graphic-encoding beam-modulator panels of the projection display of the invention may include transmissive polysilicon liquid crystal displays (LCDs), reflective digital micromirror devices (DMDs), or reflective liquid crystal displays (RLCDs).

In one embodiment of the projection display of the invention, each of the component-primary-color digital-graphic-encoding beam-modulator panels is positioned with the planar array of optical-modulator pixel elements of the beam-modulator panel located essentially coincident with the corresponding component-primary-color object plane. In an alternative embodiment of the projection display of the invention, at least one of the component-primary-color digital-graphic-encoding beam-modulator panels is positioned with the planar array of optical-modulator pixel elements of the beam-modulator panel spaced apart from the corresponding component-primary-color object plane by a component-primary-color pixel convergence defocus distance so that the corresponding component-primary-color test-point chief ray trace intersects the beam-modulator panel within about one half of the object pixel-spacing distance of the center of the corresponding optical-modulator object test-point pixel element.

A projection-optics lens assembly of the invention for a digital-graphics color projection display which permits lateral-color chromatic-aberration effects to be effectively compensated has a projection-optics entrance optical port and a projection-optics exit optical port. A projection-optics central axis is defined with respect to the projection-optics lens assembly passing centrally through the lens assembly and extending axially from the entrance optical port and the exit optical port.

A composite-color-graphics projection-display image plane in which composite-color graphics may be imaged by the projection-optics lens assembly of the invention is defined with respect to the lens assembly to extend substantially normally to the projection-optics central axis of the lens assembly spaced apart in a projected-beam exit propagation direction from the projection-optics exit optical port. An image-plane central-axis intersection point in the composite-color-graphics projection-display image plane is defined by an intersection of the projection-optics central axis with the image plane.

For each of three component primary colors—preferably; red, green, and blue—a component-primary-color projection-display object plane is defined to extend substantially normally to the projection-optics central axis of the projection-optics lens assembly of the invention spaced apart in a direction opposing a projected-beam entrance propagation direction from the projection-optics entrance optical port. A component-primary-color object-plane central-axis intersection point is defined respectively for each of the three component-primary-color projection-display object planes by an intersection of the projection-optics central axis with the respective object plane.

For each of the three component primary colors, the projection-optics lens assembly of the invention is adapted to projectively image a graphic of the component primary color located in the corresponding component-primary-color projection-display object plane onto the composite-color-graphics projection-display image plane. The projection-optics lens assembly exhibits a lateral-color chromatic aberration. For example, lateral magnification of a test composite-color object graphic having lateral extent relative to the projection-optics central axis placed at a test object location along the projection-optics central axis and projected by the lens assembly onto the composite-color-graphics projection-display image plane would differ for different component primary colors.

The projection-optics lens assembly of the invention includes an entrance optical element having an entrance optical surface located at the projection-optics entrance optical port. An intersection of the projection-optics central axis and the entrance optical surface of the projection-optics lens assembly defines an object-plane distance base point. A component-primary-color object-plane axial-position distance is defined respectively for each component-primary-color projection-display object plane measured from the object-plane distance base point on the entrance optical surface of the projection-optics lens assembly to the object-plane central-axis intersection point of the respective component-primary-color object plane.

The projection-optics lens assembly of the invention has a projection-optics aperture stop located at a projection-optics aperture-stop location along the projection-optics central axis.

A composite-color image test-point location with respect to the projection-optics lens assembly of the invention is defined in the composite-color-graphics projection-display image plane laterally displaced from the image-plane central-axis intersection point. For each component primary color, a component-primary-color test-point chief ray trace is respectively defined, optically tracing as a ray of light of the respective component primary color, from the laterally displaced composite-color image test-point location in the composite-color-graphics projection-display image plane into the projection-optics exit optical port, through the projection-optics lens assembly passing through a center point of the projection-optics aperture stop, and out of the projection-optics entrance optical port to intersect the corresponding component-primary-color projection-display object plane. Each of the three component-primary-color test-point chief ray traces respectively traces a corresponding component-primary-color-dependent path through the projection-optics lens assembly manifesting chromatic aberrations of the lens assembly, including the lateral-color chromatic aberration. A point of intersection between each component-primary-color test-point chief ray trace and the corresponding component-primary-color projection-display object plane defines a corresponding component-primary-color object test-point location. Each of the three component-primary-color object test-point locations is optically conjugate for light of the corresponding component primary color to the laterally displaced composite-color image test-point location in the composite-color-graphics projection-display image plane. Each component-primary-color object test-point location is laterally displaced from the object-plane central-axis intersection point of the corresponding component-primary-color projection-display object plane to define a component-primary-color object-test-point lateral-displacement distance.

The projection-optics aperture-stop location of the projection-optics aperture stop of the projection-optics lens assembly of the invention is a nontelecentric aperture-stop location. As a consequence of the nontelecentric aperture-stop location, each component-primary-color test-point chief ray trace intersects the corresponding component-primary-color projection-display object plane at a nontelecentric angle of intersection inclined with respect to a normal to the object plane at the point of intersection. The three component-primary-color projection-display object planes have respective axial positions along the projection-optics central axis such that, taking into account the nontelecentric angle of intersection of the corresponding component-primary-color test-point chief ray trace with the respective component-primary-color object plane and chromatic aberrations including the lateral-color chromatic-aberration differences in lateral magnification of the lens assembly at different component primary colors, the component-primary-color object-test-point lateral-displacement distances for the three component-primary-color projection-display object planes are essentially equal to one another. The respective axial positions of the three component-primary-color projection-display object planes are such that the respective component-primary-color object-plane axial-position distances of at least two of the three component-primary-color projection-display object planes—and preferably all three of the component-primary-color object planes—differ from one another so that differences in the lateral magnification of light rays of different component primary colors caused by the lateral-color chromatic aberration of the projection-optics lens assembly of the invention tend to be at least partially compensated for over the composite-color graphics imaged by the lens assembly in the composite-color-graphics projection-display image plane.

Preferably, the projection-optics lens assembly of the invention is adapted to projectively image object graphics of each of the three component primary colors which are dimensioned to fit within a corresponding generally rectangular object-graphic field referenced to the corresponding component-primary-color projection-display object plane. Such an object-graphic field preferably corresponds to the dimensions of a modulator face of a digital-graphic-encoding beam modulator panel, for example. Each of the object-graphic fields has a height dimension which is the same for all three object-graphic fields and a width dimension which is the same for all three object-graphic fields. Each object-plane axial-position distance between the object-plane distance base point on the entrance optical surface of the projection-optics lens assembly and the object-plane central-axis intersection point of the corresponding component-primary-color object plane is preferably at least twice the value of the lesser of the height dimension and the width dimension of the object-graphic fields so that when such projection-optics lens assembly is incorporated in a digital-graphics projection display, polarizing-beamsplitter elements and beam color dividing/combining elements may be accommodated between the projection-optics entrance port of the lens assembly and component-primary-color digital-graphic-encoding beam modulator panels of the projection display, which preferably are respectively located an effective axial distance from the projection optics entrance port equal to the corresponding component primary-color object-plane axial-position distance.

An image-graphic field is preferably defined on the composite-color-graphics projection-display image plane for a projection-optics lens assembly of the invention to correspond to an image of object-graphic fields of the component-primary-color projection-display object planes. Preferably, the composite-color image test-point location on the composite-color-graphics projection-display image plane is located within the image-graphic field proximate to a perimeter of the image-graphic field.

Preferably, in projection-optics lens assemblies of the invention, each component-primary-color test-point chief ray trace at the point of intersection with the corresponding component-primary-color projection-display object plane tracing in a direction generally opposing a projected-beam entrance propagation direction diverges from the projection-optics central axis.

Preferably, the respective component-primary-color object-plane axial-position distances of the three component-primary-color projection-display object planes differ from one another in a projection-optics lens assembly of the invention.

A projection display of the invention for projecting a desired composite-color digital graphic for viewing preferably includes a projection display housing and an illumination source positioned within the projection display housing at an illumination-source object location for providing white-spectrum illumination light. Preferably, beam-forming optics are positioned within the projection display housing to receive illumination light from the illumination source. The beam-forming optics are adapted to form from such light a focused illumination beam propagating substantially along an illumination-beam central axis defined with respect to the beam-forming optics.

The projection display of the invention preferably also includes a polarizing beamsplitter. An illumination-beam-reception axis, a dark-pixel-polarization-state polarized beam axis, and a light-pixel-polarization-state polarized beam axis are defined with respect to the polarizing beamsplitter. The polarizing beamsplitter is adapted to receive an illumination beam propagating towards the polarizing beamsplitter substantially along the illumination-beam reception axis, to divide from the illumination beam a linearly polarized dark-pixel-polarization-state beam propagating outwardly from the polarizing beamsplitter substantially along the dark-pixel-polarization-state polarized beam axis, to receive a mixed-polarization graphics-encoded beam containing dark-pixel-polarization-state linearly polarized light bearing a color-negative graphic and light-pixel-polarization-state linearly polarized light bearing a desired composite-color graphic propagating towards the beamsplitter substantially along the dark-pixel-polarization-state polarized beam axis, and to divide the mixed-polarization graphics-encoded beam into a dark-pixel-polarization-state linearly polarized beam bearing the color-negative graphic propagating away from the polarizing beamsplitter substantially along the illumination-beam-reception axis and a light-pixel-polarization-state linearly polarized beam bearing the desired composite-color graphic propagating outwardly from the polarizing beamsplitter substantially along the light-pixel-polarization-state polarized beam axis. The illumination-beam reception axis of the polarizing beamsplitter is preferably effectively aligned with the illumination-beam central axis of the illumination-beam forming optics.

The projection display of the invention preferably further includes beam color dividing/combining optics having a composite beam input/output optical port and three component-primary-color subbeam output/input optical ports. The beam color dividing/combining optics is adapted to accept a white-spectrum input beam propagating substantially along a composite-beam input/output central axis into the composite beam input/output optical port, divide the white-spectrum input beam into three component-primary-color output subbeams, and project each of the component-primary-color output subbeams respectively from the corresponding component-primary-color output/input optical port propagating substantially along a corresponding component-primary-color subbeam output/input central axis. The beam color dividing/combining optics is further adapted to accept respectively input subbeams of each of the three component primary colors propagating substantially along the corresponding component-primary-color subbeam output/input central axis into the corresponding one of the three component-primary-color output/input optical ports, combine the three component-primary-color input subbeams into a composite-color output beam, and project the composite-color output beam from the composite beam input/output optical port propagating substantially along the composite-beam input/output central axis. Preferably, the beam color dividing/combining optics are positioned and oriented in the projection display housing with the composite-beam input/output central axis in effective alignment with the dark-pixel-polarization-state polarized beam axis of the polarizing beamsplitter. Preferably, corresponding to each component primary color, a component-primary-color central optical path is defined passing through the beam color dividing/combining optics and the polarizing beamsplitter as a central axis of a light-pixel-polarization-state linearly polarized subbeam of light of the corresponding component primary color propagating into the corresponding component-primary-color subbeam output/input optical port substantially along the corresponding component-primary-color subbeam output/input central axis through, in turn, the beam color dividing/combining optics and the polarizing beamsplitter and outwardly from the polarizing beamsplitter substantially along the light-pixel-polarization-state polarized beam axis.

The projection display of the invention preferably also comprises projection optics mounted to the projection display housing having a projection-optics entrance optical port and a projection-optics exit optical port. A projection-optics central axis is preferably defined with respect to the projection optics passing centrally through the entrance optical port and the exit optical port. Preferably, the light-pixel-polarization-state polarized beam axis of the polarizing beamsplitter is effectively aligned with the projection-optics central axis of the projection optics. The projection optics has a projection-optics aperture stop located at a projection-optics aperture-stop location along the projection-optics central axis. The projection optics is adapted to receive through the entrance optical port a composite-color graphic-bearing beam propagating substantially along the projection-optics central axis and project the beam through the exit optical port to effectively image the composite-color graphic in a graphics display image plane which preferably extends substantially normally to the projection-optics central axis. The projection optics preferably includes an entrance optical element having an entrance optical surface through which passes the graphic-bearing beam entering the entrance optical port. Preferably, a projection-object-distance base point is defined as an intersection of the projection-optics central axis and the entrance optical surface of the projection optics. The projection optics exhibits a lateral-color chromatic aberration. For example, lateral magnification of a test composite-color object graphic having lateral extent relative to the projection-optics central axis placed at a test object graphic location along the projection-optics central axis and projected by the projection optics onto the graphics display image plane would differ for different component primary colors.

Preferably, the projection display of the invention further comprises three reflective component-primary-color digital-graphic-encoding polarization modulators. Each reflective component-primary-color polarization modulator preferably has a substantially planar reflective polarization-modulator face comprising a plurality of individually controllable reflective polarization-modulator pixel elements arranged in a planar array. Each such reflective component-primary-color polarization modulator is preferably positioned in an output subbeam interception relationship with a corresponding one of the three component-primary-color output/input optical ports of the beam color dividing/combining optics and preferably oriented with the polarization-modulator face of the reflective polarization modulator facing the corresponding component-primary-color output/input optical port and extending substantially normally to the corresponding component-primary-color subbeam output/input central axis. Preferably, a polarization-modulator-face central-axis intersection point is defined for each reflective polarization-modulator face as a point of intersection of the polarization-modulator face with the corresponding component-primary-color subbeam output/input central axis. Preferably, respective planar arrays locating the positions of reflective polarization-modulator pixel elements on the polarization-modulator faces of the three component-primary-color polarization modulators together with the respective polarization-modulator-face central-axis intersection point of the polarization-modulator faces are essentially geometrically congruent with one another. A polarization-modulator-face axial-position distance is preferably defined for each reflective polarization-modulator face measured from the polarization-modulator-face central-axis intersection point of the polarization-modulator face to the projection-object-distance base point on the entrance optical surface of the projection optics along the corresponding component-primary-color central optical path passing through the beam color dividing/combining optics and the polarizing beamsplitter.

Preferably, each reflective polarization-modulator pixel element in a reflective component-primary-color digital-graphic-encoding polarization modulator of a projection display of the invention is adapted to reflect linearly polarized component-primary-color light falling upon the pixel element and to modulate the polarization of the reflected linearly polarized light in accordance with graphics encoding control signals applied to the polarization modulator. Preferably, the reflective polarization-modulator pixel elements of a polarization-modulator face of a component-primary-color digital-graphic-encoding polarization modulator are adapted collectively to reflectively spatially modulate on a pixel array basis the polarization of a linearly polarized component-primary-color dark-pixel-polarization-state output subbeam projected from the corresponding component-primary-color subbeam output/input optical port of the beam color dividing/combining optics onto the polarization-modulator face in accordance with a corresponding primary-color component graphic of a desired composite color digital graphic to form a reflected mixed-polarization graphics-encoded component-primary-color input subbeam directed into the corresponding component-primary-color subbeam output/input optical port. Preferably, the graphics display image plane has an array of composite-color pixel locations defined with respect thereto. Each such composite-color pixel location in the graphics display image plane preferably corresponds to three reflective polarization-modulator pixel elements located respectively at effectively congruent positions on the polarization-modulator faces of the three reflective component-primary-color polarization modulators.

Preferably, a composite-color image test-point location is defined in the graphics display image plane of a projection display of the invention laterally displaced from the intersection of the projection-optics central axis with the graphics display image plane. Such image test-point location preferably corresponds to a location of a single composite-color pixel in the graphics display image plane. The composite-color image test-point location in the graphics display image plane preferably corresponds to three reflective polarization-modulator object test-point pixel elements located respectively at effectively congruent positions on the polarization-modulator faces of the three reflective component-primary-color polarization modulators, laterally displaced from the respective polarization-modulator-face central-axis intersection points of the polarization-modulator faces. Preferably, for each component primary color, a component-primary-color test-point chief ray trace is defined, tracing as a ray of light-pixel-polarization-state linearly polarized light of the component primary color, from the composite-color image test-point location in the graphics display image plane through the projection optics passing through a center point of the projection-optics aperture stop, through the polarizing beamsplitter, and through the beam color dividing/combining optics to intersect the polarization-modulator face of the corresponding component-primary-color polarization modulator at a point laterally displaced from the polarization-modulator-face central-axis intersection point of the polarization-modulator face. Each of the three component-primary-color test-point chief ray traces follows a component-primary-color-dependent path manifesting chromatic aberrations of the optics through which the chief ray trace passes including the lateral-color chromatic aberration. The projection-optics aperture-stop location of the projection-optics aperture stop is a nontelecentric aperture-stop location such that each component-primary-color test-point chief ray trace intersects the polarization-modulator face of the corresponding component-primary-color polarization modulator at a nontelecentric angle of intersection inclined with respect to a normal to the modulator face at the point of intersection. Each of the three reflective component-primary-color polarization modulators is individually positioned axially along the corresponding component-primary-color subbeam output/input central axis of the corresponding component-primary-color subbeam output/input optical port of the beam color dividing/combining optics so that, taking into account the nontelecentric angle of intersection of the component-primary-color test-point chief ray trace with the polarization-modulator face of the corresponding component-primary-color polarization modulator and chromatic aberrations of the optics through which the chief ray trace passes including the lateral-color chromatic-aberration differences in lateral magnification at the respective component primary colors, the corresponding component-primary-color test-point chief ray trace intersects the polarization-modulator face of the corresponding component-primary-color polarization modulator effectively at the polarization-modulator object test-point pixel element. Preferably, the respective polarization-modulator-face axial-position distances of the polarization-modulator faces of at least two of the three reflective component-primary-color digital-graphic-encoding polarization modulators of the projection display of the invention differ from one another so that differences in the lateral magnification of light rays of different component primary colors caused by the lateral-color chromatic aberration of the projection optics tend to be compensated for over the composite-color graphics imaged by the projection optics in the graphics display image plane.

Preferably, the component primary colors of a projection display of the invention are red, green and blue.

The composite-color image test-point location is preferably located in the periphery of the graphic display image plane of a projection display of the invention. Preferably, the composite-color image test-point location is located on the perimeter of the graphic display image plane.

Preferably, the respective polarization-modulator-face axial-position distances of the polarization-modulator faces of the three reflective component-primary-color digital-graphic-encoding polarization modulators differ from one another in a projection display of the invention.

Preferably, the polarization-modulator face of each reflective component-primary-color polarization modulator of a projection display of the invention is located at least proximate to a corresponding component-primary-color object plane optically conjugate to the graphics display image plane. One or more of the polarization-modulator faces may be spaced apart from the corresponding component-primary-color object plane a component-primary-color pixel-convergence defocus distance so that the corresponding component-primary-color test-point chief ray trace intersects the polarization-modulator face effectively at the polarization-modulator object test-point pixel element.

Suitable polarizing beamsplitters for the projection display of the invention include MacNeille-type multilayer dielectric film polarizing beamsplitters, wire-grid-polarizer polarizing beamsplitters, or alternating birefringent/nonbirefringent-film-polarizer polarizing beamsplitters. MacNeille-type multilayer dielectric film polarizing beamsplitters are described generally in U.S. Pat. No. 2,403,731 to MacNeille and U.S. Pat. No. 5,453,859 to Sannohe and Miyatake. Wire-grid-polarizer polarizing beamsplitters are generally described in published International PCT patent applications No. WO 01/09677 and No. WO 00/70386. Alternating birefringent/nonbirefringent-film-polarizer polarizing beamsplitters are described generally in published International PCT patent application No. WO 00/70386.

Beam color dividing/combining optics for a projection display of the invention preferably includes assemblies of prisms with dichroic mirrors mounted on faces of the prisms and assemblies of plate-mounted dichroic mirrors.

The projection optics of projection displays of the invention preferably deviate only modestly from a telecentric condition. Deviating from a telecentric condition in the projection optics; that is, using a finite pupil instead of an infinite pupil; establishes an angled geometry for gathering light off axis for projection by the projection optics. The angled geometry for off-axis light gathering may be used to compensate for lateral color.

A finite pupil position also helps the design of the projection optics in general. Placing the pupil closer to the physical lens assembly is a simpler constraint than the infinite pupil location of a telecentric lens assembly. Providing latitude in specifying the nontelecentric pupil location of projection optics represents a design freedom which tends to simplify the design of projection optics of projection displays of the invention relative to the design of comparable telecentric projection optics. The telecentric condition does help for uniformity of image and angular acceptance of the prism color splitting and polarization splitting components. Thus, the deviation from the telecentric condition is preferably kept modest or small for projection optics of projection displays of the invention.

Providing a separate object plane for each of the three primary colors provides a design freedom which tends to simplify the design of projection optics of projection displays of the invention relative to requiring a single object plane for the three primary colors.

A small amount of defocus may be used to shift the lateral offset of component-color object graphics to adjust color convergence in projection displays of the invention.

BRIEF DESCRIPTION OF THE DRAWINGS

Specific embodiments of the invention will be described below with reference to the following figures.

DETAILED DESCRIPTION OF SPECIFIC EMBODIMENTS

Figure 1:
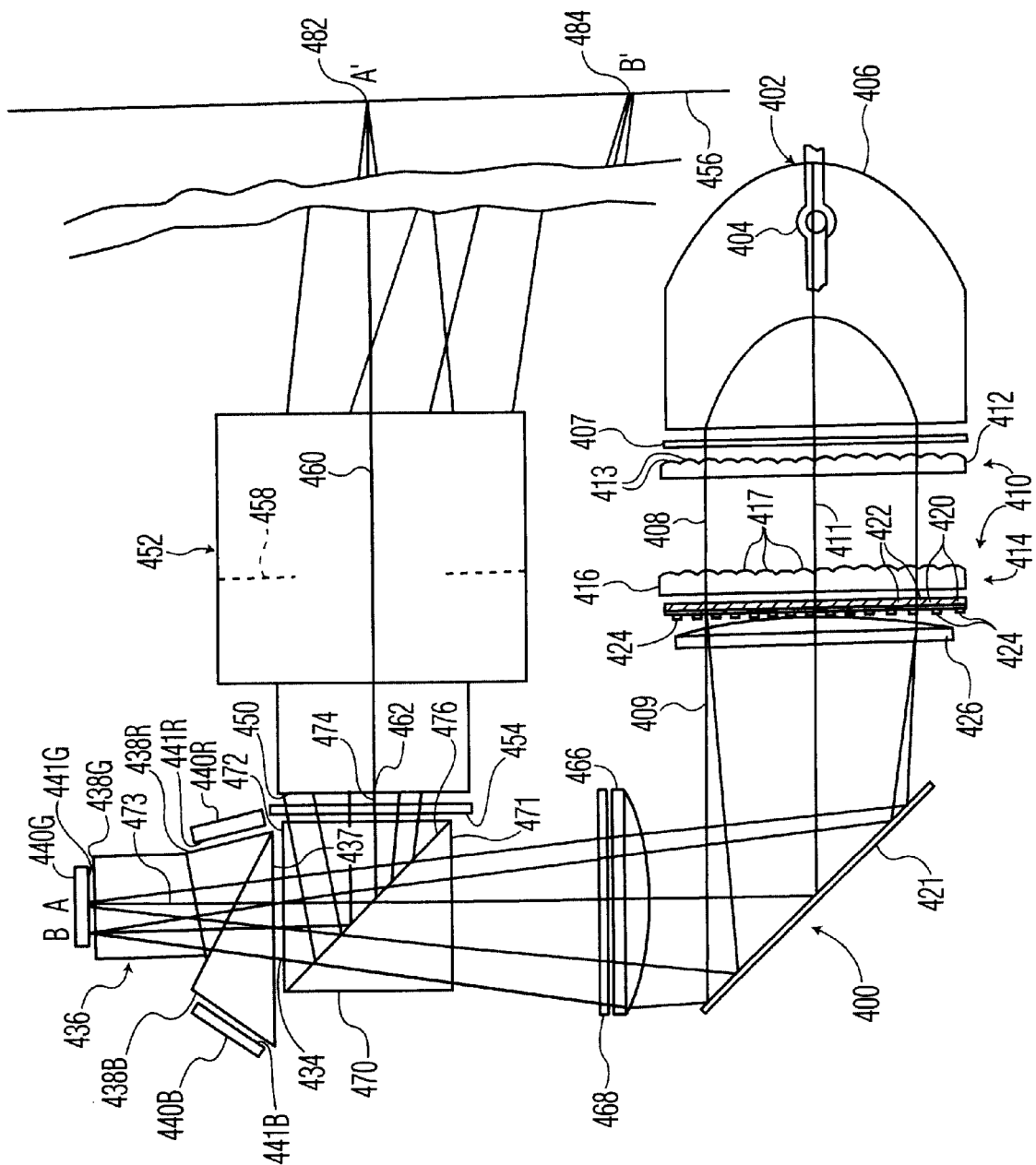
FIG. 1 is a simplified schematic optical diagram of an embodiment of the projection display of the invention.

Turning now to FIG. 1, a digital-graphics projection display 400 includes an illumination-beam source assembly 402 which includes a high-intensity lamp 404 and a parabolic reflector 406 which forms an illumination beam 408 of unpolarized white-spectrum light for the projector. An ultraviolet, infrared, and spectral notch filter assembly 407 is placed in the path of the unpolarized illumination beam 408 to remove light of ultraviolet and infrared frequencies from the beam and to impart a desired color spectral shape to the frequency spectrum of the beam.

A light-conserving beam-polarizer assembly 410 is located in the path of the unpolarized illumination beam 408 in the digital-image projector 400. The beam-polarizer assembly 410 is of a type broadly similar to a beam polarizer described in U.S. Pat. No. 5,986,809 to Itoh and Hashizume, the disclosure of which is hereby incorporated by reference. Briefly, the beam-polarizer assembly 410 includes a first lens array 412 consisting of a rectangular array of substantially rectangular planoconvex first lens elements 413. In operation, the first lens array 412 divides the illumination beam 408 into a rectangular array of focused subbeams. The effects of the beam-polarizer assembly 410 generally and the first lens array 412 in particular on the illumination beam 408 are not illustrated in FIG. 1. The beam polarizer 410 also includes a polarizing-beamsplitter/half-wave-plate assembly 414 positioned in the focal plane of the focused subbeams produced by the first lens array 412. The polarizing-beamsplitter/half-wave-plate assembly 414 includes a second lens array 416 and a plurality of pairs of alternating elongated polarizing-beamsplitter-film strips 420 and elongated reflective mirror strips 422. Both the polarizing-beamsplitter-film-strips 420 and reflective mirror strips 422 extend linearly parallel to one another in a direction perpendicular to the central ray of the illumination beam 408 and are inclined at an angle of substantially 45° with respect to a central ray of the beam 408. The second lens array 416 includes a rectangular array of substantially rectangular second lens elements 417 which correspond one-to-one to the first lens elements 413 of the first lens array 412 of beam polarizer assembly 410. Each second lens element of the second lens array 414 collimates an unpolarized subbeam from a corresponding first lens element 413 of the first lens array 412 and directs the subbeam onto a portion of a polarizing-beamsplitter-film strip 420 of the polarizing-beamsplitter/half-wave-plate assembly 414. The polarizing-beamsplitter-film strip 420 divides the unpolarized subbeam into two linearly polarized subbeams, a first of which passes through the polarizing-beamsplitter-film strip 420 and a second of which is reflected from the polarizing-beamsplitter-film strip 420 onto an adjacent reflective mirror strip 422. The first and second polarized subbeams have polarizations which are essentially orthogonal to one another. The reflective mirror strip 422 is oriented to reflect the second linearly polarized subbeam out of the polarizing-beamsplitter/half-wave-plate assembly 414 along a direction substantially parallel to the beam axis 411 of the illumination beam 408. Aligned with each polarizing beamsplitter film strip 420 is an elongated half-wave-plate strip 424. The first linearly polarized subbeam which passes through the polarizing-beamsplitter-film strip 420 also passes through the half-wave-plate strip 424. The half-wave-plate strip 424 rotates the polarization of the first linearly polarized subbeam by substantially 90° to coincide essentially with the polarization state of the second linearly polarized subbeam reflected from the reflective mirror strip 422. The beam polarizer assembly 410 thereby converts the unpolarized illumination beam 408 into a linearly polarized illumination beam 409 made up of an array of linearly polarized subbeams having essentially one polarization state, effectively without discarding light corresponding to any particular polarization state in the unpolarized illumination beam 408.

A generally planoconvex beam-shaping lens 426 is located in the path of the illumination beam 409 and serves to focus and coalesce the various subbeams in the array of linearly polarized subbeams produced by the beam-polarizing assembly 410 into a coalesced linearly polarized illumination beam. By so coalescing a plurality of subbeams into coalesced linearly polarized illumination beam, the resulting illumination beam tends to have a uniform intensity over the entire cross-sectional area of the beam.

An illumination beam redirection mirror 421 reflects the linearly polarized illumination beam 409 to provide for physical compactness of the optical layout of the projection display 400. A planoconvex relay lens 466 and a trimming sheet polarizer 468 are located in the path of the linearly polarized illumination beam 409 following the illumination beam redirection mirror 421. The planoconvex relay lens 466 in cooperation with the planoconvex beam-shaping lens 426 function to image the coalesced linearly polarized illumination beam with respect to an illumination-optics image plane. The trimming polarizer 468 is oriented to pass linearly polarized light of an orientation parallel to the nominal direction of polarization of the beam produced by the beam-polarizer assembly 410.

A MacNeille-type multilayer dielectric film polarizing beamsplitter 470 is placed in the path of the linearly polarized illumination beam 409 passing from the trimming polarizer 468. The MacNielle-type polarizing beamsplitter 470 is formed of a first beamsplitter prism 471, a second beamsplitter prism 472, and a multilayer dielectric polarizing film 476 located between the hypotenuse faces of the first and second prisms 471 and 472. The first and second beamsplitter prisms 471 and 472 are made of an optical glass. The layers of dielectric material making up the multilayer dielectric polarizing film 476 are not shown in FIG. 1. The thicknesses and indices of refraction of the layers making up the multilayer polarizing film 476 and the index of refraction of the optical glass of the beamsplitter prisms 471 and 472 are selected so that a ray of unpolarized light incident upon the multilayer film 476 at an optimum polarizing angle of essentially 45° passes into the multilayer material and strikes successive interfaces between layers of different indices of refraction at the so-called "Brewster's angle."

A ray of unpolarized light propagating through a first material which impinges upon an interface with a second material of different index of refraction at the Brewster's angle is partially reflected from the interface and partially refracted into the second material. The reflected ray is essentially totally linearly polarized, with its electric field ("E-field") oriented perpendicular to a plane of incidence defined by the direction of propagation of the ray impinging upon the interface and the normal to the interface. The refracted ray is only partially polarized, with the component the E-field in the plane of incidence stronger than the component of the E-field perpendicular to the plane of incidence. A discussion of polarization by reflection at the Brewster's angle may be found in the book *Optics* by Eugene Hecht, Third Edition, pages 342 through 346 (Addison Wesley 1998).

In the MacNeille-type multilayer dielectric film polarizing beamsplitter 470, multiple interfaces are provided in the multilayer dielectric polarizing film 476 to successively reflect polarized components of light from a light ray passing through the successive interfaces at the Brewster's angle. The thicknesses of the layers in the multilayer film are chosen so that the components of polarized light reflected from the various interfaces tend to add constructively. As a consequence, the refracted ray passing through successive interfaces becomes successively more and more polarized, with the E-field lying in the plane of incidence. Typically, a sufficient number of layers is chosen so that, as a practical matter, the ray passing completely through the multilayer dielectric polarizing film 476 is effectively completely linearly polarized with the E-field lying in the plane of incidence. The reflected ray is also effectively completely linearly polarized with, as noted above, the E-field perpendicular to the plane of incidence. The construction of conventional MacNeille-type polarizing beamsplitters based on multilayer dielectric films is described in U.S. Pat. No. 2,403,731 to MacNeille and U.S. Pat. No. 5,453,859 to Sannohe and Miyatake. MacNeille-type polarizing beamsplitters suitable for the projection display 400 are available commercially.

The beam-polarizer assembly 410, the trimming polarizer 468, and the MacNeille-type polarizing beamsplitter 470 are oriented with respect to one another so that the linearly polarized illumination beam 409 incident upon the polarizing beamsplitter 470 passes through the polarizing beamsplitter 470 as a beamsplitter-transmitted linearly polarized illumination beam 434. The polarization state of the linearly polarized illumination beam 434 passing from the polarizing beamsplitter 470 constitutes a dark-pixel polarization state, since direct reflection of the beamsplitter-transmitted linearly polarized illumination beam 434 without a change in polarization state back into the polarizing beamsplitter 470 along the axis taken by the beam in leaving the beamsplitter would result in such reflected linearly polarized beam's passing through the polarizing beamsplitter 470 and back along the path towards the illumination source assembly 402 without being diverted by the beamsplitter 470 to illuminate a display screen 456 of the projection display 400 upon which the "light" pixels of the desired graphics are imaged. The polarized illumination beam 409 propagates away from the polarizing beamsplitter 470 essentially along a dark-pixel-polarization-state polarized beam axis 473 which extends essentially normally with respect to a face of the second prism 472 of the polarizing beamsplitter 470.

The beamsplitter-transmitted polarized illumination beam 434 propagates into a primary-color dividing/combining prism assembly 436. The primary color dividing/combining prism assembly 436 includes three prisms with dichroic coatings on faces of the prisms and is adapted to divide a beam of white-spectrum light entering the prism assembly 436 into component subbeams of respectively red, green, and blue light. Since such primary color dividing/combining prism assemblies are conventional, the prism assembly will not be described in detail. In particular, the optical paths of the beamsplitter-transmitted polarized illumination beam and the red, green, and blue component subbeams in the color dividing/combining prism assembly 436 are not shown in FIG. 1. The primary-color-prism dividing/combining assembly has a composite-beam input/output optical port 437, a red component subbeam output/input optical port 438R, a green component subbeam output/input optical port 438G and a blue component subbeam output/input optical port 438B. Proximate to the red component subbeam output/input optical port 438R is a red component reflective digital-graphic-encoding liquid-crystal polarization modulator 440R. A green component reflective digital-graphic-encoding liquid-crystal polarization modulator 440G and a blue component reflective digital-graphic-encoding liquid-crystal polarization modulator 440B are located proximate respectively to the green component subbeam output/input optical port 438G and the blue component subbeam output/input optical port 438B. As discussed below, red, green, and blue component polarization-modulator faces 441R, 441G, 441B of the red, green, and blue image-component polarization modulators respectively are located in positions which differ in axial position relative to central axes of respective red, green, and blue component subbeams. Each of the red, green, and blue imagecomponent reflective polarization modulators 440R, G, B is adapted to modulate spatially selectively the polarization of a linearly polarized beam falling upon a polarization-modulator face 441R, G, B of the polarization modulator on a pixel-by-pixel basis in accordance with digital-graphics encoding signals applied to the modulators which encode a color image component of a desired colored image. Such reflective liquid crystal polarization modulators are conventional.

The signals encoding a particular color component of a desired composite-color digital graphic applied to the corresponding color polarization modulator are encoded such that a pixel element on the polarization-modulator face 441 which corresponds to a pixel in the projected image graphic which is to remain unilluminated in the particular color does not alter the polarization of linearly polarized light falling upon the pixel element. A pixel element which corresponds to a pixel in the projected graphic image which is to be illuminated in a particular color component functions to rotate the polarization of linearly polarized light falling on the pixel element to an extent which corresponds to the degree of illumination. The spatially selectively polarization-modulated component-color light subbeam formed by a particular component-color polarization modulator 440 is reflected back into the corresponding component-color subbeam output/input port 438 of the beam color dividing/combining prism assembly 436. The three component-color light subbeams retrace their respective paths through the prism assembly 436 and exit as a combined mixed-polarization composite-color light beam from the composite beam input/output port 437 of the prism assembly.

The mixed-polarization combined composite light propagates from the composite beam input/output port 437 of the prism assembly 436 substantially along a composite beam input/output central axis which is essentially aligned with the dark-pixelpolarization-state polarized beam axis 473 of the polarizing beamsplitter 470. The mixed-polarization combined composite light beam propagates into a face of the polarizing beamsplitter 470 from which the beamsplitter-transmitted polarized illumination beam 434 exited. Components of the mixed polarization composite beam whose direction of polarization was not changed by the reflective polarization modulators 440 are in the dark-pixel polarization state and consequently pass through the multilayer dielectric polarizing film 476 of the polarizing beamsplitter 470 and propagate back towards the lamp 402. Components of the mixed-polarization composite beam whose polarization was rotated by a reflective polarization modulator 440 to some extent are to such an extent in a light-pixel polarization state and to such extent are reflected by the multilayer dielectric polarizing film 476 of the polarizing beamsplitter 470. Light which is reflected from the polarizing film 476 of the polarizing beamsplitter propagates substantially along a light-pixel-polarization-state polarized beam axis 474 which extends essentially normally with respect to a face of the second prism 472 of the polarizing beamsplitter 470. The beam of light-pixel polarization-state light passes into an input port 450 of a projection lens 452 of the digital graphics projection display 400 substantially along a central axis 460 of the projection lens 452 which is essentially aligned with the light-pixel-polarization-state polarized beam axis 474 of the polarizing beamsplitter 470. A polarization analyzer filter 454 is placed between the polarizing beamsplitter 470 and the input port 450 of the projection lens 452 oriented to pass linearly polarized light of the light-pixel polarization state to improve the light-to-dark contrast ratio. The projection lens 452 projects the desired composite image carried by the rotated polarization component of the composite beam passing out of the beam color dividing/combining prism assembly onto a display screen 456 for viewing. As discussed below, a projection-lens aperture stop 458 is located along the central axis 460 of the projection lens 452 at a nontelecentric location which, in conjunction with the individual axial positions of the red, green, and blue component polarization-modulator faces 441R, 441G, 441B of polarization modulators 440R,G,B, enables color misconvergence caused by a lateral-color chromatic aberration of the projection lens 452 to be reduced.

Figure 2:
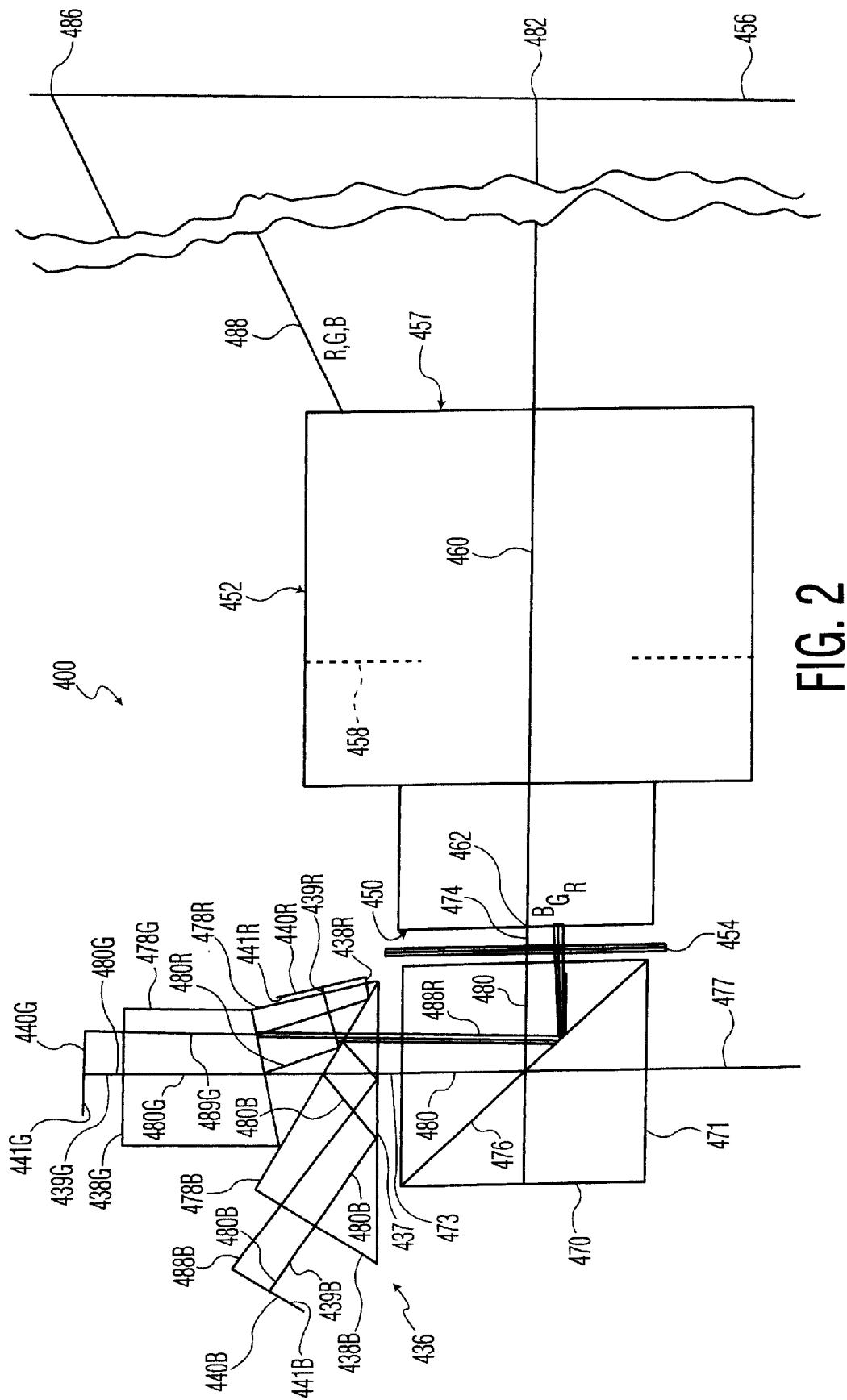
FIG. 2 is a simplified schematic optical diagram of a polarizing beamsplitter; a color dividing/combining prism assembly; red, green, and blue reflective polarization modulators; and projection optics of an embodiment of the projection display of the invention illustrating in exaggerated fashion the lack of parallelism of the respective chief rays of a ray cone focused at the center of an image and a ray cone focused at a point on the periphery of the image display resulting from the nontelecentric optics of the projection optics.

Turning next to FIG. 2, an illumination-beam-reception axis 477, the dark-pixel-polarization-state polarized beam axis 473, and the light-pixel-polarization-state polarized beam axis 474 are defined extending essentially normally from faces of the polarizing beamsplitter 470 of the projection display 400 of the invention. The primary color dividing/combining prism assembly 436 includes a red component-color prism 478R, a face of which comprises the red component subbeam output/input optical port 438R; a green component-color prism 478G, a face of which comprises the green component-subbeam output/input optical port 438G, and a blue component-color prism 478B, a first face of which comprises the blue component subbeam output/input optical port 438B. Red, green, and blue component-color subbeam output/input central axes 439R, G, B extend essentially normally from the respective red, green, and blue component-subbeam output/input optical ports 438R, G, B of the primary color dividing/combining prism assembly 436. Located proximate to the red component subbeam output/input optical port 438R and oriented essentially normally to the corresponding red component-color subbeam output/input central axis 439R is the red component-color reflective liquid-crystal polarization modulator 440R. The green component-color reflective liquid-crystal polarization modulator 440G and the blue component-color reflective liquid-crystal polarization modulator 440B are respectively located proximate to the green component subbeam output/input optical port 438G and the blue component subbeam output/input optical port 438B and are respectively oriented essentially normally to the corresponding green and blue component-color subbeam output/input central axes 439G and B. A second face of the blue component-color prism 478B comprises the composite-beam input/output optical port 437 of the primary color dividing/combining prism assembly 436. A composite-beam input/output central axis extends essentially normally from the composite-beam input/output optical port 437 of the primary color dividing/combining prism assembly 436 in effective alignment with the dark-pixel-polarization-state polarized beam axis 473 of the polarizing beamsplitter 470 of the projection display 400.

The projection optics 452 of the projection display 400 have a projection-optics entrance optical port 450 and a projection-optics exit optical port 457. The projection-optics central axis 460 is defined to extend centrally through the projection optics 452 and pass centrally through the entrance optical port 450 and the exit optical port 457. The light-pixel-polarization-state polarized beam axis 474 of the polarizing beamsplitter 470 and the projection-optics central axis 460 of the projection optics 452 are effectively aligned with one another. For each of the red, green, and blue component colors, a component-color central optical path 480R, G, B is defined to coincide with a central axis of a light-pixel-polarization-state linearly polarized subbeam of light of the corresponding component color reflected from the polarization-modulator face 441R, G, B substantially along the corresponding red, green, and blue component-color subbeam output/input central axis 439R, G, B normal to the polarization-modulator face through the beam color dividing/combining prism assembly 436, the polarizing beamsplitter 470, and the projection optics 452, where the central axis 480 of the light-pixel-polarization-state linearly polarized subbeam essentially coincides with the central axis 460 of the projection optics 452. As may be seen in FIG. 2, the red component-color central optical path 480R traces a reflection of the red light-pixel-polarization-state linearly polarized subbeam at a red-reflective/green-transmissive dichroic mirror located between the red component-color prism 478R and the green component-color prism 478G of the beam color dividing/combining prism assembly 436 and the total internal reflection of the red light-pixel-polarization-state linearly polarized subbeam at a face of the red component-color prism 478R. The blue component-color central optical path 480B traces a reflection of the blue light-pixel-polarization-state linearly polarized subbeam at a blue-reflective/red-green-transmissive dichroic mirror located between the blue component-color prism 478B and the red component-color prism 478R and the total internal reflection of the blue light-pixel-polarization-state linearly polarized subbeam at the second face of the blue component-color prism 478B. The red, green, and blue component-color central optical paths 480R, G, B are collinear in passing through the polarizing beamsplitter 470 and trace a reflection of the likewise collinear light-pixel-polarization-state linearly polarized subbeams at the multi-layer dielectric polarizing film 476 of the polarizing beamsplitter. A projection-object-distance base point 462 is defined, for convenience of measurement, to be a point of intersection between the central axis 460 of the projection optics 452 and an entrance optical surface of the projection optics, which is a point on the three central optical paths 480R, G, B along a length of the optical paths where the paths are collinear with each other and with the central axis 460 of the projection optics 452.

The projection optics 452 of the projection display 400 is designed to provide object planes for imaging red, green, and blue component color graphics on the display screen 456 of the projection display which differ in axial position. In particular, the projection optics 452 provides separate object planes for imaging red, green, and blue color-component graphics on the display screen 456 which are located at different axial distances as measured axially respectively along the corresponding component-color central optical path 480R, G, B from the projection-object-distance base point 462. Such axial distances along a component-color central optical path 480R, G, B are measured segment-by-segment from each change in direction of the optical path resulting from the reflection of the corresponding light-pixel-polarization-state linearly polarized subbeam. The three reflective component-color polarization modulators 440R, G, B are positioned so that each of the component-color polarization-modulator faces 441R, G, B is at least proximate to the object plane for imaging graphics of the corresponding component color. The differences in axial position of the three component-color polarization-modulator faces 441R, G, B are shown in an exaggerated fashion in FIG. 2.

The projection optics 452 of the projection display 400 are nontelecentric. In particular, the projection optics 452 include a projection-optics aperture stop 458 located at a nontelecentric projection-optics aperture-stop location along the projection-optics central axis 460 of the projection optics which is axially displaced from a focal point of the projection optics. The nontelecentric nature of the projection optics 452 may be seen in FIG. 2 by tracing component-color chief rays 488R, G, B from a single representative composite-color point 486 on the color graphic projected on the display screen 456 of the projection display 400 which is offset laterally from a point of intersection 482 of the central axis 460 of the projection optics 452 with the display screen 456. Each such representative component-color chief ray 488R, G, B is defined by tracing a ray of light-pixel-polarization-state linearly polarized light of the corresponding component color starting from the laterally offset composite-color point 486 on the projected graphic, through the projection optics 452 passing through the center of the projection-optics aperture stop 458, then through the polarizing beamsplitter 470 and the beam color dividing/combining prism assembly 436 to the polarization-modulator face 441R, G, B of the corresponding component-color polarization modulator 440R, G, B along a color dependent path which manifests chromatic aberrations of the projection optics 452 including the lateral-color chromatic aberration. Prior to entering the projection-optics output port 457 of the projection optics 452, the representative component-color chief rays 488R, G, B are represented in FIG. 2 as a single collinear ray. The component-color chief rays 488R, G, B are not shown passing through the interior of the projection optics 452 in FIG. 2. Upon exiting the projection-optics input port 450, the representative component-color chief rays 488R, G, B are shown as three parallel rays spaced apart from one another to represent color aberrations in the projection optics 452 including differences in lateral magnification of the three component colors provided by the projection optics 452 because of lateral-color chromatic aberration. Because the center of the projection-optics aperture stop 458 of the projection-optics 452 is a nontelecentric aperture-stop location, each of the three representative component-color chief rays 488R, G, B which pass through the center of the projection-optics aperture stop 458 intersects the polarization-modulator face 441R, G, B of the corresponding component-primary-color polarization modulator 440R, G, B at some nontelecentric angle of intersection which is inclined with respect to a normal to the modulator face 441R, G, B at the point of intersection, as may be seen in FIG. 2. The location of the projection-optics aperture stop 458 along the projection-optics central axis 460 of the projection optics 452 relative to the focal point of the projection optics is selected so that any component-color chief ray traced from a composite-color point on the display screen 456 laterally offset from the point of intersection 482 of the central axis 460 of the projection optics 452 with the display screen diverges from the corresponding component-color central optical path 480R, G, B along a direction proceeding away from the corresponding component-color output/input optical port 438R, G, B of the beam color dividing/combining prism assembly 436 of the projection display. In general, the greater the lateral offset of a composite-color point on the display screen 456 from the point of intersection 482 of the central axis 460 of the projection optics 452 with the display screen 456, the greater the nontelecentric angle of intersection of a component-color chief ray corresponding to the composite-color point with the polarization-modulator face 441R, G, B of the corresponding component-primary-color polarization modulator 440R, G, B. The divergence between component-color chief rays traced from a chosen laterally offset composite-color test-point on the display screen 456 and the corresponding component-color central optical paths 480R, G, B and the individual axial positions of the polarization-modulator faces 441R, G, B of the corresponding component-color polarization modulators 440R, G, B are selected in the projection display 400 of the invention to provide compensation for differences in lateral magnification along the different test-point component-color chief rays by the projection optics 452 resulting from chromatic aberration of the projection optics, thereby tending to provide at least partial compensation for differences in lateral magnification for different component colors over the entire composite-color graphic.

Figure 3:
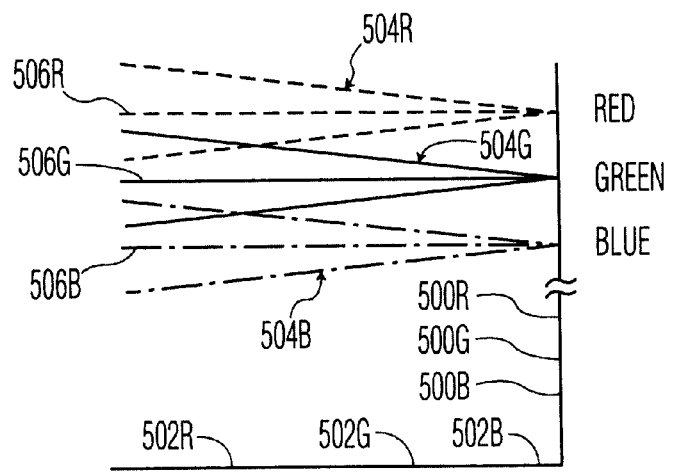
FIG. 3 is a simplified diagram representing lateral color misconvergence in a prior-art projection display with telecentric projection optics and red, green, and blue reflective liquid-crystal polarization modulators positioned in longitudinally equivalent display object planes.

Color misconvergence in a hypothetical prior-art first projection display caused by lateral-color chromatic aberration of a projection lens of the projection display is illustrated in FIG. 3. The hypothetical prior-art first projection display of FIG. 3 employs reflective red, green, and blue component-color liquid-crystal polarization modulators (not shown), a polarizing beamsplitter (not shown), a beam color dividing/combining prism assembly (not shown), and a conventional telecentric projection lens (not shown) arranged in an optical layout generally similar to that of the projection display of U.S. Pat. No. 5,777,789 discussed above. A simplified schematic side view diagram is shown in FIG. 3 of superimposed upper half portions of red, green, and blue component-color polarization-modulator faces 500R, G, B of respectively red, green, and blue reflective liquid-crystal polarization modulators (not shown) of the prior-art projection display. For each of the red, green, and blue component colors, a component-color central optical path 502R, G, B is defined to coincide with a central axis of a light-pixel-polarization-state linearly polarized subbeam of light of the corresponding component color reflected from the polarization-modulator face 500R, G, B substantially along a normal to the polarization-modulator face through the beam color dividing/combining prism assembly (not shown), the polarizing beamsplitter (not shown), and the projection lens (not shown) where the central axis of the light-pixel-polarization-state linearly polarized subbeam essentially coincides with a central axis of the projection lens. In the hypothetical prior-art first projection display of FIG. 3, the three polarization-modulator faces 500R, G, B are located at the same axial distance from an arbitrary base point (not shown) measured axially along the corresponding component-color central optical path 502R, G, B. The arbitrary base point is located on the three component-color central optical paths at a location—such as at an entrance surface to the projection lens—along a length of the optical paths where the paths are collinear. Thus, although the three polarization-modulator faces 500R, G, B have different locations and orientations from one another in the hypothetical prior-art first projection display as determined by the geometry of the beam color dividing/combining prism assembly, the polarization-modulator faces are shown superimposed upon one another in the schematic side-view diagram of FIG. 3 for simplicity. Each reflective polarization-modulator face 500R, G, B includes a plurality of individually controllable reflective polarization-modulator pixel elements (not shown) arranged in a planar array. Respective planar arrays locating the positions of the pixel elements on the polarization-modulator faces 500R, G, B together with respective points of intersection between the polarization-modulator face and the corresponding component-color central optical paths are essentially geometrically congruent with one another. Although not specifically shown in FIG. 3, the superposition of the three polarization-modulator faces 500R, G, B as illustrated in FIG. 3 is to be understood as on a pixel-element by pixel-element geometrically congruent basis.

Three test-point component-color ray cones 504R, G, B correspond to a single laterally-offset composite-color test point (not shown) on a graphic projected on a display screen (not shown) produced by means of the three reflective polarization modulators of the hypothetical prior-art first projection display of FIG. 3. The composite-color test point is located on the periphery of the graphic laterally displaced from a center point of the graphic at which the central axis of the projection lens intersects the display screen. The test-point red-component ray cone 504R, for example, is defined by, starting from the composite-color test point on the projected graphic, tracing all of the rays of red light-pixel-polarization-state linearly polarized light which illuminate the test point back through the projection lens, the polarizing beamsplitter, and the beam color dividing/combining prism assembly to the polarization-modulator face 500R of the red component-color polarization modulator along red-color dependent paths which manifest chromatic aberrations of the projection lens including the lateral-color chromatic aberration. Similarly, starting from the same composite-color test point on the projected graphic and tracing all of the rays of green light-pixel-polarization-state linearly polarized light which illuminate the test point back through the projection lens, the polarizing beamsplitter, and the beam color dividing/combining prism assembly to the polarization-modulator face 500G of the green component-color polarization modulator along green-color dependent paths which manifest chromatic aberrations of the projection lens including the lateral-color chromatic aberration defines the green test-point component-color ray cone 504G. Likewise, starting from the composite-color test point and tracing all of the rays of blue light-pixel-polarization-state linearly polarized light which illuminate the test point back through the projection lens, the polarizing beamsplitter, and the beam color dividing/combining prism assembly to the polarization-modulator face 500B of the blue component-color polarization modulator along blue-color dependent paths which manifest chromatic aberrations of the projection lens including the lateral-color chromatic aberration defines the blue test-point component-color ray cone 504B.

Each of the three test-point component-color ray cones 504R, G, B of the hypothetical prior-art first projection display of FIG. 3 includes a test-point component-color chief ray 506R, G, B defined with respect to the projection lens of the projection display. Since the projection lens (not shown) is telecentric, the lens has a projection-lens aperture stop located along the central axis of the lens at a focal point of the lens. Each test-point component-color chief ray 506R, G, B is defined by tracing a ray of light-pixel-polarization-state linearly polarized light of the component color starting from the composite-color test point on the projected graphic through the projection lens passing through the center of the projection-lens aperture stop—that is, through the focal point of the lens—then through the polarizing beamsplitter and the beam color dividing/combining prism assembly to the polarization-modulator face 500R, G, B of the corresponding component-color polarization modulator along a color dependent path which manifests chromatic aberrations of the projection lens including the lateral-color chromatic aberration. Because the projection lens of the hypothetical prior-art projection display is telecentric, at the point of intersection with the corresponding polarization-modulator face 500R, G, B, each of the test-point component-color chief rays 506R, G, B extends parallel to the corresponding component-color central optical path 502R, G, B and essentially normally to the corresponding polarization-modulator face 500R, G, B.

Because of lateral-color chromatic aberration in the projection lens, the lateral magnification of the red component-color of a composite-color graphic imaged by the projection lens differs from the lateral magnification of the green color-component of the graphic imaged by the projection lens, which in turn differs from the lateral magnification of the blue color-component image imaged by the projection lens. As a consequence, the red, green, and blue test-point component-color ray cones 504R, G, B do not coincide in the superimposed side view of FIG. 3; instead, the points at which the ray cones 504R, G, B respectively intersect the corresponding polarization-modulator faces 500R, G, B differ in lateral offset from—for example, as illustrated in FIG. 3, differ in height above—the points at which the central axes 502R, G, B intersect the corresponding polarization-modulator faces 500R, G, B. If such differences in lateral offset are greater than the center-to-center spacing of the reflective polarization-modulator pixel elements in the polarization modulators, the single laterally-offset composite-color test point in the projected graphic could be illuminated by red light reflected from a pixel element of the red component-color polarization modulator corresponding to a first pixel address, green light reflected from a pixel element of the green component-color polarization modulator corresponding to a second, different pixel address, and blue light reflected from a pixel element of the blue component-color polarization modulator corresponding to yet a third pixel address. Thus lateral-color chromatic aberration in a projection lens can give rise to significant color misconvergence problems in a color digital-graphics projection display.

Generally, in addition to lateral-color chromatic aberration, an optical system tends to have a second type of chromatic aberration referred to as axial color chromatic aberration. Axial color chromatic aberration in an optical system is manifested by collimated beams of light of different colors incident upon the system along a central axis of the system being focused to different focal points on the central axis spaced apart from one another axially. In the hypothetical prior-art first projection display of FIG. 3, the optics of the projection lens have been color corrected to compensate for axial color chromatic aberration sufficiently so that each of the component-color graphics encoded in the light-pixel-polarization-state linearly polarized subbeams produced by means of the respective three component-color polarization-modulator faces 500R, G, B located at the same axial distance from the arbitrary base point are adequately in focus as imaged on the display screen of the projection display.

Figure 4:
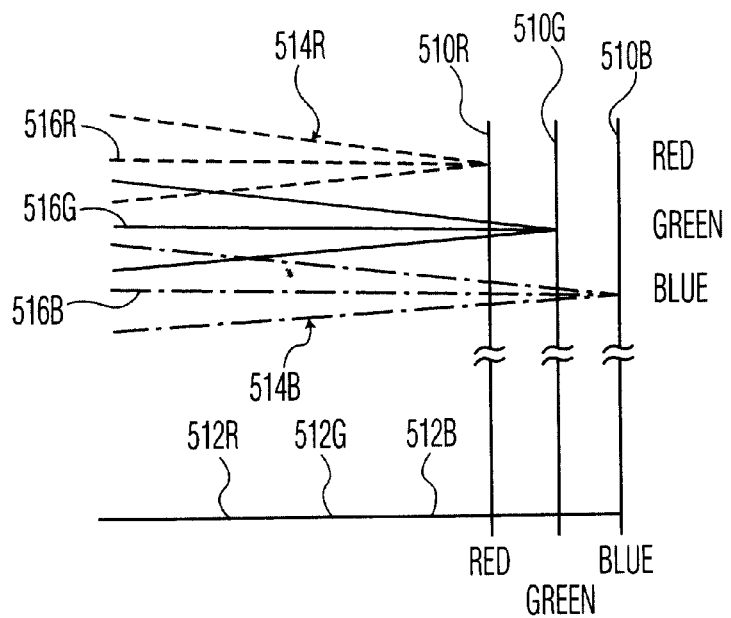
FIG. 4 is a simplified diagram representing lateral color misconvergence in a hypothetical projection display with telecentric projection optics and red, green, and blue reflective polarization modulators positioned in longitudinally different display object planes.

Turning now to FIG. 4, effects of lateral-color chromatic aberration in a projection lens are shown for a hypothetical second projection display which differs from the hypothetical prior-art first projection display of FIG. 3 in that the projection lens of the second projection display, which is telecentric, has not been color corrected with respect to axial color chromatic aberration to the same extent as the projection lens of the first projection display. Specifically, the projection lens of the hypothetical second projection display of FIG. 4 provides object planes for the red, green, and blue component colors which differ in axial position. Similar to FIG. 3, a simplified schematic side view is shown in FIG. 4 of upper half portions of red, green, and blue component-color polarization-modulator faces 510R, G, B of respectively red, green, and blue reflective liquid-crystal polarization modulators (not shown). For each of the red, green, and blue component colors, a component-color central optical path 512R, G, B is defined for the second projection display as the component-color central optical paths 502R, G, B were defined for the first projection display of FIG. 3 discussed above. The telecentric projection lens (not shown) of the hypothetical second projection display of FIG. 4 provides object planes for imaging red, green, and blue component-color graphics on a display screen (not shown) which are located at different axial distances as measured axially respectively along the corresponding component-color central optical path 512R, G, B from an arbitrary base point located on the three central optical paths at a position along a length of the optical paths where the paths are collinear. The three reflective component-color polarization modulators are positioned so that each of the component-color polarization-modulator faces 510R, G, B coincides with the object plane for imaging graphics of the corresponding component color.

In the hypothetical second projection display of FIG. 4, each of the three polarization-modulator faces 510R, G, B is oriented normally to a corresponding component-color central optical path 512R, G, B entering a corresponding component-color output/input optical port of a beam color dividing/combining prism assembly (not shown) of the projection display. Consequently, the three polarization-modulator faces 510R, G, B have different orientations and locations in the projection display. For simplicity, in the schematic side-view diagram of FIG. 4, the component-color polarization-modulator faces 510R, G, B are shown oriented parallel to one another. The polarization-modulator faces 510R, G, B in FIG. 4 are shown spaced apart from one another axially to represent the differences in axial distance of the polarization-modulator faces from the arbitrary base point measured along the corresponding component-color central optical path 512R, G, B. Although not shown specifically in FIG. 4, the polarization-modulator faces 510R, G, B as illustrated in FIG. 4 are to be understood as being in axial alignment with corresponding pixel elements of the three polarization-modulator faces aligned axially along axes which parallel the direction of the component-color central optical paths 512R, G, B as illustrated normal to the polarization-modulator faces.

Analogous to the test-point component-color ray cones 504R, G, B of the hypothetical prior-art first projection display of FIG. 3, three test-point component-color ray cones 514R, G, B of the hypothetical second projection display of FIG. 4 correspond to a single laterally offset composite-color test point (not shown) on the periphery of a graphic projected on a display screen (not shown) of the second projection display produced by means of the three reflective polarization modulators of the projection display. In particular, the three test-point component-color ray cones 514R, G, B of the second projection display of FIG. 4 are defined just as were the test-point component-color ray cones 504R, G, B of the first projection display of FIG. 3 discussed above. Likewise, each of the three test-point component-color ray cones 514R, G, B of the hypothetical second projection display of FIG. 4 includes a test-point component-color chief ray 516R, G, B defined with respect to the telecentric projection lens of the projection display just as were the test-point component-color chief rays 506R, G, B of the first projection display of FIG. 3 discussed above. Because the projection lens of the hypothetical second projection display is telecentric, at the point of intersection with the corresponding polarization-modulator face 510R, G, B, each of the test-point component-color chief rays 516R, G, B extends parallel to the corresponding component-color central optical path 512R, G, B and essentially normally to the corresponding polarization-modulator face 510R, G, B. Because of lateral-color chromatic aberration in the projection lens, the lateral magnification differs for the red, green, and blue component-color graphics imaged by the projection lens. Consequently, the points at which the red, green, and blue test-point component-color ray cones 514R, G, B intersect the corresponding polarization-modulator faces 510R, G, B differ in lateral offset from the points at which the central axes 512R, G, B intersect the corresponding polarization-modulator faces. If such differences in lateral offset are greater than the center-to-center spacing of the reflective polarization-modulator pixel elements in the polarization modulators, the single laterally-offset composite-color test point in the projected graphic could be illuminated by light of the red, green, and blue component colors reflected from component-color pixel elements of the three component-color polarization modulators corresponding to three different pixel addresses. Lateral color effects in the projection lens of the hypothetical second projection display of FIG. 4 can thus give rise to significant color misconvergence.

Figure 5:
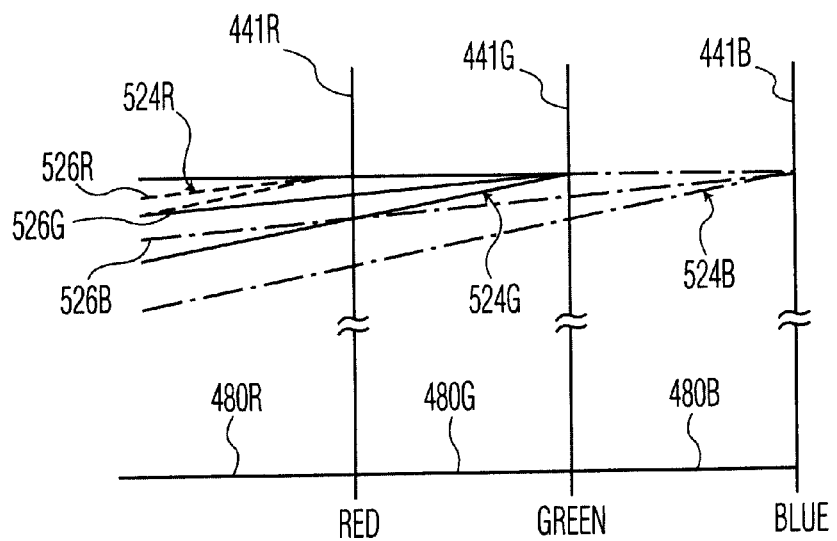
FIG. 5 is a simplified diagram representing lateral color convergence in an embodiment of the projection display of the invention with nontelecentric projection optics and red, green, and blue reflective polarization modulators positioned in longitudinally different display object planes.

FIG. 5 illustrates compensation of effects of lateral-color chromatic aberration in the projection optics 452 in the embodiment of the projection display 400 of the invention shown in FIG. 1. Similar to FIGS. 3 and 4, a simplified schematic side view is shown in FIG. 5 of upper half portions of red, green, and blue component-color polarization-modulator faces 441R, G, B of respectively red, green, and blue reflective liquid-crystal polarization modulators 440R, G, B (not shown in FIG. 5). The projection optics 452 of the projection display 400 provides object planes for imaging red, green, and blue component color graphics on the display screen 456 of the projection display which differ in axial position. In general, such multiple-object-plane projection optics tend to be simpler to design and less expensive to produce than projection optics of otherwise comparable performance constrained to provide a single object plane for imaging all three of the red, green, and blue component color graphics on a display screen. For each of the red, green, and blue component colors, a component-color central optical path 480R, G, B is defined to coincide with a central axis of a light-pixel-polarization-state linearly polarized subbeam of light of the corresponding component color reflected from the polarization-modulator face 441R, G, B substantially along a normal to the polarization-modulator face through the beam color dividing/combining prism assembly 436, the polarizing beamsplitter 470, and the projection optics 452, where the central axis of the light-pixel-polarization-state linearly polarized subbeam essentially coincides with a central axis 460 of the projection optics 452. The projection optics 452 of the projection display 400 provides separate object planes for imaging red, green, and blue color-component graphics on the display screen 456 which are located at different axial distances as measured axially respectively along the corresponding component-color central optical path 480R, G, B from a projectionobject-distance base point 462 defined, for convenience of measurement, to be a point of intersection between the central axis 460 of the projection optics 452 and an entrance optical surface of the projection optics, which is a point on the three central optical paths 480R, G, B along a length of the optical paths where the paths are collinear. The three reflective component-color polarization modulators 440R, G, B are positioned so that each of the component-color polarization-modulator faces 441R, G, B is at least proximate to the object plane for imaging graphics of the corresponding component color.

In the projection display 400 of FIG. 5, each of the three polarization-modulator faces 441R, G, B is oriented normally to the corresponding component-color central optical path 480R, G, B entering the corresponding component-color output/input optical port 438R, G, B of the beam color dividing/combining prism assembly 436 of the projection display. Consequently, the orientations and locations of the three polarization-modulator faces 441R, G, B in the projection display are different from one another, as may be seen in FIG. 1. As in the case of the hypothetical second projection display of FIG. 4, in the schematic side-view diagram of FIG. 5, the component-color polarization-modulator faces 441R, G, B are shown oriented parallel to one another for simplicity. The polarization-modulator faces 441R, G, B are shown in FIG. 5 spaced apart from one another axially to represent the differences in axial distance of the polarization-modulator faces from the projection-object-distance base point 462 measured along the corresponding component-color central optical path 480R, G, B. Each reflective polarization-modulator face 441R, G, B includes a plurality of individually controllable reflective polarization-modulator pixel elements (not shown) arranged in a planar array. Respective planar arrays locating the positions of the pixel elements on the polarization-modulator faces 441R, G, B together with respective points of intersection between the polarization-modulator faces and the corresponding component-color central optical path are essentially geometrically congruent with one another. Although not shown specifically in FIG. 5, the polarization-modulator faces 441R, G, B as illustrated in FIG. 5 are to be understood as being in axial alignment with corresponding pixel elements of the three polarization-modulator faces aligned axially along axes which parallel the direction of the component-color central optical paths 480R, G, B where normal to the polarization-modulator faces.

As with the test-point component-color ray cones 504R, G, B and 514R, G, B of the hypothetical first and second projection displays of FIGS. 3 and 4, three test-point component-color ray cones 524R, G, B in FIG. 5 correspond to a single composite-color test point 484—shown in FIG. 1—on the periphery of a composite-color graphic projected on the display screen 456 laterally offset from a point of intersection 482 of the central axis 460 of the projection optics 452 of the embodiment of the projection display 400 of the invention. In particular, each test-point component-color ray cone 524R, G, B is defined by, starting from the composite-color test point 484 on the projected graphic, tracing all of the rays of light-pixel-polarization-state linearly polarized light of the corresponding color which illuminate the test point back through the projection optics 452, the polarizing beamsplitter 470, and the beam color dividing/combination prism assembly 436 to the polarization-modulator face 441R, G, B of the corresponding component-color polarization modulator 440R, G, B along color dependent paths which manifest chromatic aberrations of the projection optics 452 including the lateral-color chromatic aberration.

The projection optics 452 of the projection display 400 are nontelecentric with a projection-optics aperture stop 458 located at a nontelecentric projection-optics aperturestop location along the projection-optics central axis 460 of the projection optics which is axially displaced from a focal point of the projection optics. Each of the three test-point component-color ray cones 524R, G, B of the projection display 400 includes a test-point component-color chief ray 526R, G, B defined with respect to the nontelecentric projection optics 452 of the projection display. Each test-point component-color chief ray 526R, G, B is defined by tracing a ray of light-pixel-polarization-state linearly polarized light of the corresponding component color starting from the composite-color test point 484 on the projected graphic, through the projection optics 452 passing through the center of the projection-optics aperture stop 458, then through the polarizing beamsplitter 470 and the beam color dividing/combining prism assembly 436 to the polarization-modulator face 441R, G, B of the corresponding component-color polarization modulator 440R, G, B along a color dependent path which manifests chromatic aberrations of the projection optics 452 including the lateral-color chromatic aberration. Because the center of the projection-optics aperture stop 458 of the projection-optics 452 is a nontelecentric aperture-stop location, each component-color test-point chief ray 526R, G, B which passes through the center of the projection-optics aperture stop 458 intersects the polarization-modulator face 441R, G, B of the corresponding component-primary-color polarization modulator 440R, G, B at a nontelecentric angle of intersection which is inclined with respect to a normal to the modulator face 441R, G, B at the point of intersection, as may be seen in FIG. 5. In particular, the location of the projection-optics aperture stop 458 along the projection-optics central axis 460 of the projection optics 452 relative to the focal point of the projection optics is selected so that each of the component-color test-point chief rays 526R, G, B diverges from the corresponding component-color central optical path 480R, G, B along a direction proceeding away from the corresponding component-color output/input optical port 438R, G, B of the beam color dividing/combining prism assembly 436 of the projection display. Consequently, as the axial distance of a polarization-modulator face 441R, G, B from the projection-object-distance base point 462 measured along the corresponding component-color central optical path 480R, G, B increases, the lateral offset at which the corresponding component-color test-point chief ray 526R, G, B—and the corresponding test-point component-color ray cone 524R, G, B itself—intersects the polarization-modulator face 441R, G, B increases. Thus, as shown in FIG. 5, if the axial positions of the respective polarization-modulator faces 441R, G, B for the component colors are selected taking into account the nontelecentric angle of intersection of the component-color test-point chief rays 526R, G, B of the test-point component-color ray cones 524R, G, B relative to the component-color central optical paths 480R, G, B, the nontelecentric projection optics 452 can be designed to provide compensation for differences in lateral magnification of component-color subbeams of different colors by the projection optics 452 arising from lateral-color chromatic aberration. For a fixed design of the projection optics 452, moving a component-color polarization-modulator face 441R, G, B away from the corresponding object plane established for the component color by the projection optics 452 causes the component-color graphic encoded by the polarization-modulator face 441 to tend to move out of focus on the display screen 456. The nontelecentric angle of intersection of the component-color test-point chief rays 526R, G, B with the polarization-modulator faces 441R, G, B permits a small amount of defocus to be used to adjust color convergence on the display screen 456.

Figure 6:
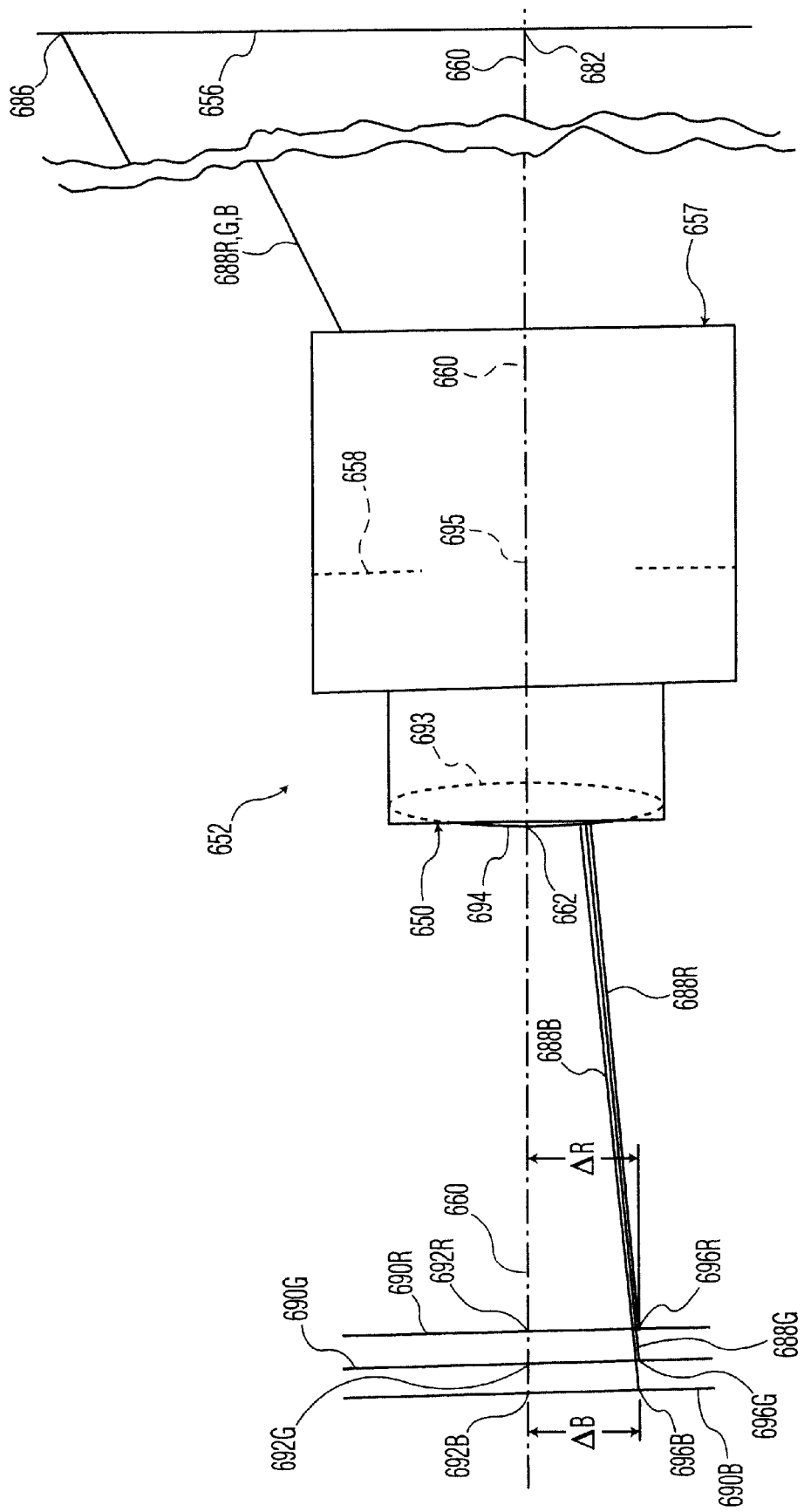
FIG. 6 is a simplified schematic optical diagram of an embodiment of the projection-optics lens assembly of the invention for use in a digital-graphics projection display.

Turning now to FIG. 6, an embodiment of a projection-optics lens assembly 652 of the invention is suitable for incorporation in a digital-graphics color projection display of the invention such as the projection display 400 of FIG. 1. The lens assembly 652 has a projection-optics entrance optical port 650 and a projection-optics exit optical port 657. A projection-optics central axis 660 passes centrally through the lens assembly 600 and extends axially from the entrance optical port 650 and the exit optical port 657.

Composite-color graphics may be imaged by the projection-optics lens assembly 652 in a composite-color-graphics projection-display image plane 656 which extends normally to the projection-optics central axis 660 of the lens assembly 652 spaced apart from the projection-optics exit optical port 657. The projection-optics central axis 660 of the lens assembly 652 intersects the composite-color-graphics projection-display image plane 656 at an image-plane central-axis intersection point 682.

A red-component-color projection-display object plane 690R extends normally to the projection-optics central axis 660 of the projection-optics lens assembly 652 at a location spaced apart from the projection-optics entrance optical port 650. Likewise, a green-component-color projection-display object plane 690G and a blue-component-color projection-display object plane 690B respectively extend normally to the projection-optics central axis 660 of the lens assembly 652. The projection-optics central axis 660 intersects the red-component-color projection-display object plane 690R at a red-component-color object-plane central-axis intersection point 692R. The projection-optics central axis 660 intersects the green-component-color projection-display object plane 690G at a green-component-color object-plane central-axis intersection point 692G and intersects the blue-component-color projection-display object plane 690B at a blue-component-color object-plane central-axis intersection point 692B.

The projection-optics lens assembly exhibits both axial color effects and lateral color effects. As discussed in more detail below, each of the red, green, and blue component-color projection-display object planes 690R, G, B has a different axial location along the projection-optics central axis 660. With respect to red light, the projection-optics lens assembly 652 is adapted to projectively image a red-colored graphic located in the red-component-color projection-display object plane 690R onto the composite-color-graphics projection-display image plane 656. With respect to green light, the lens assembly 652 is adapted to projectively image a green-colored graphic located in the green-component-color projection-display object plane 690G also onto the composite-color-graphics projection-display image plane 656. Likewise with respect to blue light, the lens assembly 652 is adapted to image a blue-colored graphic located in the blue-component-color projection-display object plane 690B onto the composite-color-graphics projection-display image plane 656. The projection-optics lens assembly 652 exhibits a lateral-color chromatic aberration in that lateral magnification of a test composite-color object graphic having lateral extent relative to the projection-optics central axis 660 placed at a test object location along the central axis 660 and projected by the lens assembly onto the composite-color-graphics projection-display image plane 656 would differ for different component primary colors, as well as be out of focus to a degree for all but at most one component primary color because of the axial color effects.

The projection-optics lens assembly 652 includes an entrance lens 693 located at the projection-optics entrance optical port 650. The entrance lens 693 has an entrance optical surface 694 facing outwardly of the entrance optical port 650. The projection-optics central axis 660 intersects the entrance optical surface 694 of the entrance lens 693 at an object-plane distance base point 662 which serves as a convenient point for measuring object-plane axial-position distances between the lens assembly 652 and the red, green, and blue-component-color projection-display object planes 690R, G, B.

The projection-optics lens assembly 652 has a projection-optics aperture stop 658 which is located at a projection-optics aperture-stop location 695 along the projection-optics central axis 660. The projection-optics aperture-stop location 695 is a nontelecentric location selected to obtain a certain angled geometry for gathering light off-axis for projection, as discussed below.

A composite-color image test-point location 686 is located in the composite-color-graphic projection-display image plane 656 displaced laterally from the image-plane central-axis intersection point 682. For each of the red, green, and blue component primary colors, a corresponding test-point chief ray trace is determined with respect to the projection-optics lens assembly 652. Determination of chief ray traces is conventional in optical design. See, for example, pages 173 through 175 of *Optics,* third edition, by Eugene Hecht (Addison-Wesley, 1998), incorporated herein by reference.

The red component-color test-point chief ray trace extends as a ray of red light from the laterally displaced composite-color image test point location 686 in the composite-color-graphics projection-display image plane 656 into the projection-optics exit optical port 657, through the projection-optics lens assembly 652 passing through a center point of the projection-optics aperture stop 658—which coincides with the projection-optics aperture-stop location 695 on the projection-optics central axis 660—and out of the projection-optics entrance optical port 650 to intersect the red component color projection-display object plane 690R. The red component-color test-point chief ray trace 688R traces a red-color-dependent path through the projection-optics lens assembly 652 which manifests the chromatic aberrations of the lens assembly, including the lateral-color chromatic aberration. The green component color test-point chief ray trace 688G and the blue component-color test-point chief ray trace 688B are determined analogously. The green component-color test-point chief ray trace 688G traces a green-color-dependent path through the lens assembly 652 and the blue component-color test-point chief ray trace 688B traces a blue-color-dependent path through the lens assembly 652. The color-dependent paths taken respectively by the green and blue-component test-point chief ray traces 688G and 688B manifest the chromatic aberrations of the lens assembly 652, including the lateral-color chromatic aberration. Prior to entering the projection-optics optical output port 657 of the projection-optics lens assembly 652, the red, green, and blue component-color chief ray traces 688R, G, B are represented in FIG. 6 as a single collinear ray. The component color chief ray traces 688R, G, B are not shown passing through the interior of the lens assembly 652 in FIG. 6. Upon exiting the projection-optics optical input port 650, the red, green and blue chief ray traces 688R, G, and B are shown as three parallel rays spaced apart from one another to represent chromatic aberrations in the projection-optics lens assembly 652, including differences in lateral magnification of the three component colors resulting from the lateral-color chromatic aberration of the lens assembly 652.

The red component-color test-point chief ray trace 688R intersects the red component-color projection-display object plane 690R at a red component-color object test point location 696R. The green component-color test-point chief ray trace 688G intersects the corresponding green component-color projection-display object plane 690G at a green component-color object test-point location 696G. Similarly, the blue component-color test-point chief ray trace intersects the blue component-color projection-display object plane 690B at a blue component-color object test-point location 696B. Each of the red, green, and blue component-color object test-point locations 696R, G, and B is optically conjugate to the composite-color image test-point location 686 in the composite-color-graphics projection-display image plane 656 for light of the corresponding red, green, or blue primary color.

Each of the red, green, and blue component-color object test-point locations 696R, G, B is laterally displaced from the object-plane central-axis intersection point 692R, G, B of the corresponding red, green, and blue component-color projection-display object plane 690R, G, B. A red component-color object test-point lateral-displacement distance between the red component-color object test-point location 696R and the red component-color object-plane central-axis intersection point 692R is denoted in FIG. 6 by $\Delta_R$. Likewise, a blue component-color object test-point lateral-displacement distance between the blue component-color object test-point location 696B and the blue component-color object-plane central-axis intersection point 692B is denoted $\Delta_B$. A green-color object-test-point lateral-displacement distance $\Delta_G$ (not shown in FIG. 6) is the distance between the green component-color object test-point location 696G and the green component-color object plane central-axis intersection point 692G.

As noted above, the projection-optics aperture-stop location 695 of the projection-optics aperture stop 658 of the projection-optics lens assembly 652 is nontelecentric aperture-stop location. Consequently, as shown in exaggerated fashion in FIG. 6, each of the red, green, and blue component-color test-point chief ray traces intersects the corresponding component-color projection-display object plane 690R, G, B at a nontelecentric angle of intersection which is inclined with respect to a normal to the object plane at the point intersection. The respective axial position along the projection-optics central-axis 660 of the three red, green, blue component-color projection-display object planes 690R, G, B are chosen such that, taking into account the nontelecentric angle of intersection of the corresponding component-color test-point chief ray trace 688R, G, B with the respective component-color object plane 690R, G, B and the axial position of the component-color object plane 690 R, G, B, the red, green, and blue component-color object-test-point lateral-displacement distances $\Delta_R$, $\Delta_G$, $\Delta_B$ are essentially equal to one another. For use in a particular digital graphics projection display which employs digital-graphic-encoding beam modulator panels, the red, green, and blue component-color object-test-point lateral-displacement distances $\Delta_R$, $\Delta_G$, $\Delta_B$ are advantageously constrained to be equal to one another to within at least the center-to-center spacing distance of adjacent pixel elements of the beam modulator panels. Because of the effects of the chromatic aberrations of the projection-optics lens assembly 652, the object-plane axial-position distances between the object-plane distance base point 692 on the entrance optical surface 694 of the entrance lens 693 of the lens assembly 652 and the respective object-plane central-axis intersection points 692R, G, B of the corresponding red, green, and blue component-color projection-display object planes 690R, G, B differ from one another in order that the condition of essential equality of the red, green, and blue component-color object-test-point lateral-displacement distances $\Delta_R$, $\Delta_G$, $\Delta_B$ be satisfied.

The projection-optics lens assembly 652 may be used to advantage in a digital graphics projection display which employs digital-graphic-encoding beam modulator panels for separately modulating beams of red, green and blue light which are then combined to form a composite-color graphic-bearing beam for projection through the lens assembly 652 to image a composite-color graphic at the composite-color-graphics projection-display image plane 656. The lens assembly may be designed to provide component-color object-plane axial-position distances between the object-plane distance base point 692 at the entrance optical port 650 of the lens assembly 652 and the respective object-plane central-axis intersection points 692R, G, B of the corresponding red, green, and blue component-color projection-display object planes 690R, G, B sufficiently great to accommodate polarizing beamsplitter and beam color dividing/combining elements between the entrance optical port 650 and digital-graphic-encoding beam modulator panels for red, green, and blue light beams positioned at object plane locations with optical paths extending respectively between the entrance optical port 650 and the respective beam modulator panels through the polarizing beamsplitter and beam color dividing/combining elements effectively corresponding to the respective red, green, and blue component-color object-plane axial-position distances. One arrangement of polarizing beamsplitter and beam color dividing/combining elements for a digital graphics projection display is discussed above in connection with the embodiment of projection display of FIGS. 1 and 2. Other arrangements of polarizing beamsplitter and beam color dividing/combining elements expected to be suitable for use with the projection-optics lens assembly 652 in a digital graphics projection display include arrangements disclosed in U.S. Pat. No. 6,113,239 to Sampsell and Florence and U.S. Pat. No. 6,183,091 to Johnson and Sharp, for example.

Consider an embodiment of a projection display of the invention with prism components which accept an image cone with an F-number of F/2.8. If the projection display were to operate at F/3.8, a chief ray tilt of 2.7 degrees could be introduced and still all rays would remain within the F/2.8 image cone of the prism optics. An axial shift of an imaging panel by 100 microns would give a chief ray height shift of about 5 microns. Such a height shift would be a large fraction of a pixel and would generally be expected to give enough freedom to compensate lateral color. The chosen location of pupil position should also be taken account in the design of the illumination system. The powers of lenses and distances in the illumination system would change relative to those of a display with telecentric projection optics, but such changes would present no great technical difficulty.

A procedure expected to be generally suitable for designing a projection lens for a projection display of the invention using optical design software is described below.

Optimize an initial design for best imaging from a given object—the display screen—to a single image plane—the polarization modulator. Impose a telecentric condition in merit function by including a center (chief) ray angle. Imaging is characterized by spot size. Characterize imaging at three central wavelengths for red, green, and blue. Ordinarily one would be left with lateral color; that is, the image sizes in the three colors are different and do not all meet the target. Then try and determine initial pupil location. If a variation in panel location of say $\Delta z$ is accepted, and the residual lateral color is $\Delta h$, then the pupil angle in radians is approximately, $\theta p = \Delta h/\Delta z$. Set this pupil angle target in the merit function, as opposed to a zero angle.

Create a multi-configuration system in the design software. There are three configurations with the panel location different for each color, and the variable is final image distance. Modify the merit function so that the image properties in each color correspond to its configuration. Initially the distance change in each color is $\Delta z = \Delta h/\theta p$.

Optimize the system based on the new conditions. Allow the image distance to be a variable in each configuration. Allow the pupil angle to vary within a limited range. With these additional variables one is now able to get a lens with good imaging performance.

From the accepted lens design there is a finite pupil angle. Use this pupil angle as a constraint into the design of the illumination system. So re-design the illumination system with the pupil properties of the new projection lens.

It is not intended to limit the present invention to the specific embodiments described above. For example the projection displays of the invention may use imaging panels other than the reflective liquid-crystal polarization modulators described above, such as transmissive polysilicon liquid crystal displays or reflective discrete mirror devices. It is recognized that changes may be made in the invention specifically described herein without departing from the scope and teachings of the instant invention, and it is intended to encompass all other embodiments, alternatives, and modifications consistent with the invention.

What is claimed is:

1. A projection display for projecting a desired composite-color digital graphic onto a composite-color image plane for viewing; the projection display including nontelecentric projection optics to establish an angled geometry for gathering light off axis for projection by the projection optics; the projection optics providing a plurality of component-primary-color object planes respectively for object digital graphics of different primary colors to be projectively displayed through the projection optics on the composite-color image plane; at least two of the component-primary-color object planes being located at different effective axial distances from the projection optics; the effective axial distances of the object planes from the projection optics respectively being keyed to the angled geometry of the off-axis light gathering of the projection optics and to lateral-color chromatic-aberration differences in lateral magnification by the projection optics at different primary colors so that such color-dependent differences in lateral magnification tend to be compensated.

2. The projection display according to claim 1 in which the projection optics provide three component-primary-color object planes respectively for object graphics of red, green, and blue.

3. The projection display according to claim 2 in which the effective axial distances of the three component-primary-color object planes from the projection optics differ from one another.

4. The projection display according to claim 2 further comprising three component-primary-color digital-graphic-encoding beam-modulator panels; each beam-modulator panel corresponding respectively to one of the component primary colors of red, green, and blue; each beam-modulator panel comprising a plurality of optical-modulator pixel elements arranged in a planar array; each of the component-primary-color digital-graphic-encoding beam-modulator panels being positioned with the planar array of optical-modulator pixel elements of the beam-modulator panel located proximate to the corresponding component-primary-color object plane; each optical-modulator pixel element of a component-primary-color beam-modulator panel being adapted to controllably modulate optically light illuminating the pixel element in accordance with graphics-encoding control signals applied to the beam-modulator panel; the optical-modulator pixel elements of a component-primary-color beam-modulator panel being adapted collectively to spatially optically modulate on a pixel array basis a component-primary-color light beam illuminating the beam-modulator panel in accordance with a corresponding primary-color graphic component of the desired composite-color digital graphic to form a graphics-encoded component-primary-color beam; a component-primary-color encoded-beam central axis being defined respectively for each graphics-encoded component-primary-color beam; each component-primary-color encoded-beam central axis intersecting the corresponding component-primary-color beam-modulator panel at essentially normal incidence at a component-primary-color modulator-panel central-axis intersection point; respective planar arrays locating the positions of optical-modulator pixel elements on the three component-primary-color beam-modulator panels together with the respective component-primary-color modulator-panel central-axis intersection points being essentially geometrically congruent with one another; an object pixel-spacing distance being defined as an average center-to-center distance between adjacent pixel elements in the beam-modulator panels; the composite-color image plane having an array of composite-color pixel locations defined with respect thereto; each composite-color pixel location in the composite-color image plane corresponding to three optical-modulator pixel elements located respectively at essentially congruent positions on the beam-modulator panels; a projection-optics central axis being defined with respect to the projection optics passing centrally through the projection optics; the projection optics having a projection optics aperture stop located at a projection-optics aperture stop location along the projection-optics central axis; a composite-color image-plane central-axis intersection point being defined by an intersection of the projection-optics central axis with the composite-color image plane; the composite-color image-plane central-axis intersection point corresponding to the three component-primary-color modulator-panel central-axis intersection points; a composite-color image test-point location being defined in the composite-color image plane laterally displaced from the composite-color image-plane central-axis intersection point; the image test-point location corresponding to a location of a single composite-color pixel in the composite-color image plane; the composite-color image test-point location in the composite-color image plane corresponding to three optical-modulator object test-point pixel elements located respectively at essentially congruent positions on the three component-primary-color beam-modulator panels; for each component primary color, a component-primary-color test-point chief ray trace being defined, tracing as a ray of light of the component primary color, from the composite-color image test-point location in the composite-color image plane through the projection optics, passing through a center point of the projection-optics aperture stop, and through any intervening optics of the projection display to intersect the corresponding component-primary-color beam-modulator panel at a point laterally displaced from the central-axis intersection point of the beam-modulator panel; each of the three component-primary-color test-point chief ray traces tracing a component-primary-color-dependent path manifesting chromatic aberrations of the optics through which the chief ray trace passes including the lateral-color chromatic-aberration differences in lateral magnification; the projection-optics aperture-stop location of the projection-optics aperture stop being a nontelecentric aperture-stop location such that each component-primary-color test-point chief ray trace intersects the corresponding component-primary-color beam-modulator panel at a nontelecentric angle of intersection inclined with respect to a normal to the beam-modulator panel at the point of intersection in accordance with the angled geometry for gathering light off axis for projection by the nontelecentric projection optics; each of the three component-primary-color beam-modulator panels being individually positioned axially with effective axial distances from the projection optics so that, taking into account the nontelecentric angle of intersection of the component-primary-color test-point chief ray trace with the corresponding component-primary-color beam-modulator panel and chromatic aberrations including the lateral-color chromatic-aberration differences in lateral magnification at the respective component primary colors, the corresponding component-primary-color test-point chief ray trace intersects the beam-modulator panel within about one half of the pixel-spacing distance of a center of the corresponding object test-point pixel element, so that differences in the lateral magnification of light rays of different component primary colors of the projection optics tend to be compensated for over the composite-color graphics imaged by the projection optics in the composite-color image plane.

5. The projection display according to claim 4 in which the digital-graphic-encoding beam-modulator panels of the projection display are selected from the group consisting of transmissive polysilicon liquid crystal displays (LCDs), reflective digital micromirror devices (DMDs), and reflective liquid crystal displays (RLCDs).

6. The projection display according to claim 4 in which each of the component-primary-color digital-graphic-encoding beam-modulator panels is positioned with the planar array of optical-modulator pixel elements of the beam-modulator panel located essentially coincident with the corresponding component-primary-color object plane.

7. The projection display according to the claim 4 in which at least one of the component-primary-color digital-graphic-encoding beam-modulator panels is positioned with the planar array of optical-modulator pixel elements of the beam-modulator panel spaced apart from the corresponding component-primary-color object plane by a component-primary-color pixel convergence defocus distance so that the corresponding component-primary-color test-point chief ray trace intersects the beam-modulator panel within about one half of the object pixel-spacing distance of the center of the corresponding optical-modulator object test-point pixel element.

8. A projection-optics lens assembly for a digital-graphics color projection display; the lens assembly having a projection-optics entrance optical port and a projection-optics exit optical port; a projection-optics central axis being defined with respect to the projection-optics lens assembly passing centrally through the lens assembly and extending axially from the entrance optical port and the exit optical port; a composite-color-graphics projection-display image plane being defined to extend substantially normally to the projection-optics central axis spaced apart in a projected-beam exit propagation direction from the projection-optics exit optical port; an image-plane central-axis intersection point being defined by an intersection of the projection-optics central axis with the composite-color-graphics projection-display image plane; for each of three component primary colors, a component-primary-color projection-display object plane being defined to extend substantially normally to the projection-optics central axis spaced apart in a direction opposing a projected-beam entrance propagation direction from the projection-optics entrance optical port; a component-primary-color object-plane central-axis intersection point being defined respectively for each of the three component-primary-color projection-display object planes by an intersection of the projection-optics central axis with the respective object plane; for each of the three component primary colors, the projection-optics lens assembly being adapted to projectively image a graphic of the component primary color located in the corresponding component-primary-color projection-display object plane onto the composite-color-graphics projection-display image plane; the projection-optics lens assembly exhibiting a lateral-color chromatic aberration; the projection-optics lens assembly having a projection-optics aperture stop located at a projection-optics aperture-stop location along the projection-optics central axis; the projection-optics lens assembly including an entrance optical element having an entrance optical surface located at the projection-optics entrance optical port; an intersection of the projection-optics central axis and the entrance optical surface of the projection-optics lens assembly defining an object-plane distance base point; a component-primary-color object-plane axial-position distance being defined respectively for each component-primary-color projection-display object plane measured from the object-plane distance base point on the entrance optical surface of the projection-optics lens assembly to the object-plane central-axis intersection point of the respective component-primary-color object plane; a composite-color image test-point location being defined in the composite-color-graphics projection-display image plane laterally displaced from the image-plane central-axis intersection point; for each component primary color, a component-primary-color test-point chief ray trace being defined respectively, optically tracing as a ray of light of the respective component primary color, from the laterally displaced composite-color image test-point location in the composite-color-graphics projection-display image plane into the projection-optics exit optical port, through the projection-optics lens assembly passing through a center point of the projection-optics aperture stop, and out of the projection-optics entrance optical port to intersect the corresponding component-primary-color projection-display object plane; each of the three component-primary-color test-point chief ray traces respectively tracing a corresponding component-primary-color-dependent path through the projection-optics lens assembly manifesting chromatic aberrations of the lens assembly including lateral-color chromatic-aberration differences in lateral magnification at different component primary colors; a point of intersection between each component-primary-color test-point chief ray trace and the corresponding component-primary-color projection-display object plane defining a corresponding component-primary-color object test-point location which is optically conjugate for light of the corresponding component primary color to the laterally displaced composite-color image test-point location in the composite-color-graphics projection-display image plane; each component-primary-color object test-point location being laterally displaced from the object-plane central-axis intersection point of the corresponding component-primary-color projection-display object plane to define a component-primary-color object-test-point lateral-displacement distance; the projection-optics aperture-stop location of the projection-optics aperture stop being a nontelecentric aperture-stop location such that each component-primary-color test-point chief ray trace intersects the corresponding component-primary-color projection-display object plane at a nontelecentric angle of intersection inclined with respect to a normal to the object plane at the point of intersection; the three component-primary-color projection-display object planes having respective axial positions along the projection-optics central axis such that, taking into account the nontelecentric angle of intersection of the corresponding component-primary-color test-point chief ray trace with the respective component-primary-color object plane and chromatic aberrations including the lateral-color chromatic-aberration differences in lateral magnification at the respective component primary colors, the component-primary-color object-test-point lateral-displacement distances for the three component-primary-color projection-display object planes are essentially equal to one another; the respective axial positions of the three component-primary-color projection-display object planes being such that the respective component-primary-color object-plane axial-position distances of at least two of the three component-primary-color projection-display object planes differ from one another so that differences in the lateral magnification of light rays of different component primary colors caused by the lateral-color chromatic aberration of the projection-optics lens assembly tend to be at least partially compensated for over the composite-color graphics imaged by the lens assembly in the composite-color-graphics projection-display image plane.

9. The projection-optics lens assembly according to claim 8 in which the lens assembly is adapted to projectively image component-primary-color object graphics dimensioned to fit within a generally rectangular object-graphic field referenced to the component-primary-color projection-display object planes, the object-graphic field having a height dimension and a width dimension, each object-plane axial-position distance between the object-plane distance base point on the entrance optical surface of the projection-optics lens assembly and the object-plane central-axis intersection point of the corresponding component-primary-color object plane being at least twice the value of the lesser of the height dimension and the width dimension of the object-graphic field.

10. The projection-optics lens assembly according to claim 9 in which an image-graphic field is defined on the composite-color-graphics projection-display image plane to correspond to an image of the object-graphic field of the component-primary-color projection-display object planes, the composite-color image test-point location on the composite-color-graphics projection-display image plane being located within the image-graphic field proximate to a perimeter of the image-graphic field.

11. The projection-optics lens assembly according to claim 9 in which each component-primary-color test-point chief ray trace at the point of intersection with the corresponding component-primary-color projection-display object plane tracing in a direction generally opposing a projected-beam entrance propagation direction diverges from the projection-optics central axis.

12. The projection-optics lens assembly according to claim 9 in which the respective component-primary-color object-plane axial-position distances of the three component-primary-color projection-display object planes differ from one another.

13. A projection display for projecting a desired composite-color digital graphic for viewing, comprising:

a. a projection display housing;

b. an illumination source positioned within the projection display housing at an illumination-source object location for providing white-spectrum illumination light;

c. beam-forming optics positioned within the projection display housing to receive illumination light from the illumination source and adapted to form from such light a focused illumination beam propagating substantially along an illumination-beam central axis defined with respect to the beam-forming optics;

d. a polarizing beamsplitter having defined with respect thereto an illumination-beam-reception axis, a dark-pixel-polarization-state polarized beam axis, and a light-pixel-polarization-state polarized beam axis; the polarizing beamsplitter being adapted to receive an illumination beam propagating towards the polarizing beamsplitter substantially along the illumination-beam reception axis, to divide from the illumination beam a linearly polarized dark-pixel-polarization-state beam propagating outwardly from the polarizing beamsplitter substantially along the dark-pixel-polarization-state polarized beam axis, to receive a mixed-polarization graphics-encoded beam containing dark-pixel-polarization-state linearly polarized light bearing a color-negative graphic and light-pixel-polarization-state linearly polarized light bearing a desired composite-color graphic propagating towards the beamsplitter substantially along the dark-pixel-polarization-state polarized beam axis, and to divide the mixed-polarization graphics-encoded beam into a dark-pixel-polarization-state linearly polarized beam bearing the color-negative graphic propagating away from the polarizing beamsplitter substantially along the illumination-beam-reception axis and a light-pixel-polarization-state linearly polarized beam bearing the desired composite-color graphic propagating outwardly from the polarizing beamsplitter substantially along the light-pixel-polarization-state polarized beam axis; the illumination-beam reception axis of the polarizing beamsplitter being effectively aligned with the illumination-beam central axis of the illumination-beam forming optics;

e. beam color dividing/combining optics having a composite beam input/output optical port and three component-primary-color subbeam output/input optical ports; the beam color dividing/combining optics being adapted to accept a white-spectrum input beam propagating substantially along a composite-beam input/output central axis into the composite beam input/output optical port, divide the white-spectrum input beam into three component-primary-color output subbeams, and project each of the component-primary-color output subbeams respectively from the corresponding component-primary-color subbeam output/input optical port propagating substantially along a corresponding component-primary-color subbeam output/input central axis and to accept respectively input subbeams of each of the three component primary colors propagating substantially along the corresponding component-primary-color subbeam output/input central axis into the corresponding one of the three component-primary-color output/input optical ports, combine the three component-primary-color input subbeams into a composite-color output beam, and project the composite-color output beam from the composite beam input/output optical port propagating substantially along the composite-beam input/output central axis; the beam color dividing/combining optics being positioned and oriented in the projection display housing with the composite-beam input/output central axis in effective alignment with the dark-pixel-polarization-state polarized beam axis of the polarizing beamsplitter; corresponding to each component primary color, a component-primary-color central optical path being defined passing through the beam color dividing/combining optics and the polarizing beamsplitter as a central axis of a light-pixel-polarization-state linearly polarized subbeam of light of the corresponding component primary color propagating into the corresponding component-primary-color subbeam output/input optical port substantially along the corresponding component-primary-color subbeam output/input central axis through, in turn, the beam color dividing/combining optics and the polarizing beamsplitter and outwardly from the polarizing beamsplitter substantially along the light-pixel-polarization-state polarized beam axis;

f. projection optics mounted to the projection display housing having a projection-optics entrance optical port and a projection-optics exit optical port; a projection-optics central axis being defined with respect to the projection optics passing centrally through the entrance optical port and the exit optical port; the light-pixel-polarization-state polarized beam axis of the polarizing beamsplitter being effectively aligned with the projection-optics central axis of the projection optics; the projection optics having a projection-optics aperture stop located at a projection-optics aperture-stop location along the projection-optics central axis; the projection optics being adapted to receive through the entrance optical port a composite-color graphic-bearing beam propagating substantially along the projection-optics central axis and project the beam through the exit optical port to effectively image the composite-color graphic in a graphics display image plane which extends substantially normally to the projection-optics central axis; the projection optics including an entrance optical element having an entrance optical surface through which passes such graphic-bearing beam entering the entrance optical port; an intersection of the projection-optics central axis and the entrance optical surface of the projection optics defining a projection-object-distance base point; the projection optics exhibiting a lateral-color chromatic aberration; and g. three reflective component-primary-color digital-graphic-encoding polarization modulators; each reflective component-primary-color polarization modulator having a substantially planar reflective polarization-modulator face comprising a plurality of individually controllable reflective polarization-modulator pixel elements arranged in a planar array; each reflective component-primary-color polarization modulator being positioned in an output subbeam interception relationship with a corresponding one of the three component-primary-color output/input optical ports of the beam color dividing/combining optics and oriented with the polarization-modulator face of the reflective polarization modulator facing the corresponding component-primary-color output/input optical port and extending substantially normally to the corresponding component-primary-color subbeam output/input central axis; a polarization-modulator-face central-axis intersection point being defined for each reflective polarization-modulator face as a point of intersection of the polarization-modulator face with the corresponding component-primary-color subbeam output/input central axis; respective planar arrays locating the positions of reflective polarization-modulator pixel elements on the polarization-modulator faces of the three component-primary-color polarization modulators together with the respective polarization-modulator-face central-axis intersection points on the polarization-modulator faces being essentially geometrically congruent with one another; a polarization-modulator-face axial-position distance being defined for each reflective polarization-modulator face measured from the polarization-modulator central-axis intersection point of the polarization-modulator face to the projection-object-distance base point on the entrance optical surface of the projection optics along the corresponding component-primary-color central optical path passing through the beam color dividing/combining optics and the polarizing beamsplitter; each reflective polarization-modulator pixel element in a reflective component-primary-color digital-graphic-encoding polarization modulator being adapted to reflect linearly polarized component-primary-color light falling upon the pixel element and to modulate the polarization of the reflected linearly polarized light in accordance with graphics encoding control signals applied to the polarization modulator so that collectively the reflective polarization-modulator pixel elements of a polarization-modulator face of a component-primary-color digital-graphic-encoding polarization modulator are adapted to reflectively spatially modulate on a pixel array basis the polarization of a linearly polarized component-primary-color dark-pixel-polarization-state output subbeam projected from the corresponding component-primary-color subbeam output/input optical port of the beam color dividing/combining optics onto the polarization-modulator face in accordance with a corresponding primary-color component graphic of a desired composite-color digital graphic to form a reflected mixed-polarization graphics-encoded component-primary-color input subbeam directed into the corresponding component-primary-color subbeam output/input optical port; the graphics display image plane having an array of composite-color pixel locations defined with respect thereto; each composite-color pixel location in the graphics display image plane corresponding to three reflective polarization-modulator pixel elements located respectively at effectively congruent positions on the polarization-modulator faces of the three reflective component-primary-color polarization modulators; a composite-color image test-point location being defined in the graphics display image plane laterally displaced from the intersection of the projection-optics central axis with the graphics display image plane; the image test-point location corresponding to a location of a single composite-color pixel in the graphics display image plane; the composite-color image test-point location in the graphics display image plane corresponding to three reflective polarization-modulator object test-point pixel elements located respectively at effectively congruent positions on the polarization-modulator faces of the three reflective component-primary-color polarization modulators laterally displaced from the respective polarization-modulator-face central-axis intersection points locations of the polarization-modulator faces; for each component primary color, a component-primary-color test-point chief ray trace being defined, tracing as a ray of light-pixel-polarization-state linearly polarized light of the component primary color, from the composite-color image test-point location in the graphics display image plane through the projection optics passing through a center point of the projection-optics aperture stop, through the polarizing beamsplitter, and through the beam color dividing/combining optics to intersect the polarization-modulator face of the corresponding component-primary-color polarization modulator at a point laterally displaced from the polarization-modulator-face central-axis intersection point of the polarization-modulator face; each of the three component-primary-color test-point chief ray traces tracing a component-primary-color-dependent path manifesting chromatic aberrations of the optics through which the chief ray trace passes including the lateral-color chromatic aberration, the projection-optics aperture-stop location of the projection-optics aperture stop being a nontelecentric aperture-stop location such that each component-primary-color test-point chief ray trace intersects the polarization-modulator face of the corresponding component-primary-color polarization modulator at a nontelecentric angle of intersection inclined with respect to a normal to the modulator face at the point of intersection; each of the three reflective component-primary-color polarization modulators being individually positioned axially along the corresponding component-primary-color subbeam output/input central axis of the corresponding component-primary-color subbeam output/input optical port of the beam color dividing/combining optics so that, taking into account the nontelecentric angle of intersection of the component-primary-color test-point chief ray trace with the polarization-modulator face of the corresponding component-primary-color polarization modulator and the chromatic aberrations of the optics through which the chief ray trace passes including the lateral-color chromatic-aberration differences in lateral magnification at the respective component primary colors, the corresponding component-primary-color test-point chief ray trace intersects the polarization-modulator face of the corresponding component-primary-color polarization modulator effectively at the polarization-modulator object test-point pixel element; the respective polarization-modulator-face axial-position distances of the polarization-modulator faces of at least two of the three reflective component-primary-color digital-graphic-encoding polarization modulators differing from one another so that differences in the lateral magnification of light rays of different component primary colors caused by the lateral-color chromatic aberration of the projection optics tend to be compensated for over the composite-color graphics imaged by the projection optics in the graphics display image plane.

14. The projection display according to claim 13 in which the component primary colors are red, green, and blue.

15. The projection display according to claim 14 in which the composite-color image test-point location is located on or proximate to a periphery of an image-graphic field defined on the graphic display image plane to correspond to an image of a polarization-modulator face of a digital-graphic-encoding polarization modulator of the projection display.

16. The projection display according to claim 14 in which the respective polarization-modulator-face axial-position distances of the polarization-modulator faces of the three reflective component-primary-color digital-graphic-encoding polarization modulators differ from one another.

17. The projection display according to claim 14 in which the polarization-modulator face of each reflective component-primary-color polarization modulator is located at least proximate to a corresponding component-primary-color object plane optically conjugate to the graphics display image plane and at least one of the polarization-modulator faces is spaced apart from the corresponding component-primary-color object plane a component-primary-color pixel-convergence defocus distance so that the corresponding component-primary-color test-point chief ray trace intersects the polarization-modulator face effectively at the polarization-modulator object test-point pixel element.

18. The projection display according to claim 14 in which the polarizing beamsplitter is a MacNeille-type multilayer dielectric film polarizing beamsplitter, a wire-grid-polarizer polarizing beamsplitter, or an alternating birefringent/nonbirefringent-film-polarizer polarizing beamsplitter.

* * * * *